US012465929B2

(12) United States Patent
Tomac

(10) Patent No.: US 12,465,929 B2
(45) Date of Patent: Nov. 11, 2025

(54) FLUIDIC OSCILLATOR DEVICE WITH ATOMIZED OUTPUT

(71) Applicant: Ohio State Innovation Foundation, Columbus, OH (US)

(72) Inventor: Mehmet Tomac, Worthington, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 750 days.

(21) Appl. No.: 17/776,906

(22) PCT Filed: Nov. 14, 2019

(86) PCT No.: PCT/US2019/061506
§ 371 (c)(1),
(2) Date: May 13, 2022

(87) PCT Pub. No.: WO2021/096516
PCT Pub. Date: May 20, 2021

(65) Prior Publication Data
US 2022/0401969 A1 Dec. 22, 2022

(51) Int. Cl.
*B05B 12/08* (2006.01)
*B05B 1/08* (2006.01)

(52) U.S. Cl.
CPC .............. *B05B 1/08* (2013.01); *B05B 12/082* (2013.01)

(58) Field of Classification Search
CPC ............ B05B 1/08; B05B 12/082; B05B 1/26
See application file for complete search history.

(56) References Cited

U.S. PATENT DOCUMENTS 2,916,873 A 12/1959 Walker
2,943,821 A 7/1960 Wetherbee
(Continued)

FOREIGN PATENT DOCUMENTS

CA 2711711 2/2012
DE 102017206849 10/2018
(Continued)

OTHER PUBLICATIONS

European Patent Office. Communication under Rule 71(3). Issued in European Application No. 18883610.0 on May 16, 2023. 8 pages.
(Continued)

*Primary Examiner* — Qingzhang Zhou
(74) *Attorney, Agent, or Firm* — Meunier Carlin & Curfman LLC

(57) ABSTRACT

Various implementations include a feedback type and jet interaction-type fluidic oscillator devices with atomized output. The device includes first and second fluidic oscillators. Each of the first and second fluidic oscillators include an interaction chamber, a fluid supply inlet, an outlet nozzle, and first and second feedback channels. The first feedback channel of the first fluidic oscillator share a common intermediate portion such that the first feedback channels are in fluid communication with each other, causing the fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the fluid streams exiting the outlet nozzle of the first fluidic oscillator and the outlet nozzle of the second fluidic oscillator collide with each other, creating an atomized spray.

18 Claims, 15 Drawing Sheets

(56) References Cited

U.S. PATENT DOCUMENTS

| | | | |
|---|---|---|---|
| 3,117,593 | A | 1/1964 | Sowers, III |
| 3,204,405 | A | 9/1965 | Warren et al. |
| 3,212,259 | A | 10/1965 | Edward |
| 3,228,410 | A | 1/1966 | Warren |
| 3,266,510 | A | 8/1966 | Wadey |
| 3,427,809 | A | 2/1969 | Lavoie |
| 3,448,752 | A | 6/1969 | O'Neill |
| 3,552,415 | A | 1/1971 | Small |
| 3,605,778 | A | 9/1971 | Metzger |
| 3,614,964 | A | 10/1971 | Chen |
| 3,749,317 | A | 7/1973 | Osofsky |
| 4,122,845 | A | 10/1978 | Stouffer |
| 4,463,904 | A | 8/1984 | Bray, Jr. |
| 4,508,267 | A | 4/1985 | Stouffer |
| 4,596,364 | A | 6/1986 | Bauer |
| 4,955,547 | A | 9/1990 | Woods |
| 5,524,660 | A | 6/1996 | Dugan |
| 5,749,525 | A | 5/1998 | Stouffer |
| 5,827,976 | A | 10/1998 | Stouffer et al. |
| 5,845,845 | A | 12/1998 | Merke et al. |
| 5,876,182 | A | 3/1999 | Schulte |
| 6,253,782 | B1 | 7/2001 | Raghu |
| 6,497,375 | B1 | 12/2002 | Srinath et al. |
| 7,036,749 | B1 | 5/2006 | Steerman |
| 7,128,062 | B2 * | 10/2006 | Kuo .................... F02D 13/0246 123/316 |
| 7,128,082 | B1 * | 10/2006 | Cerretelli .............. B05B 7/0075 137/833 |
| 7,775,456 | B2 * | 8/2010 | Gopalan ................... B05B 1/08 137/809 |
| 8,172,162 | B2 | 5/2012 | Gopalan et al. |
| 8,297,540 | B1 | 10/2012 | Vijay |
| 8,382,043 | B1 | 2/2013 | Raghu |
| 8,869,320 | B1 | 10/2014 | Santamarina et al. |
| 9,333,517 | B2 | 5/2016 | Koklu |
| 9,339,825 | B2 | 5/2016 | Koklu |
| 9,802,209 | B2 | 10/2017 | Koklu |
| 10,429,138 | B2 | 10/2019 | Gissen et al. |
| 2005/0087633 | A1 | 4/2005 | Gopalan |
| 2006/0157596 | A1 | 7/2006 | Tippetts |
| 2007/0063076 | A1 | 3/2007 | Gopalan |
| 2008/0149205 | A1 | 6/2008 | Gupta et al. |
| 2010/0123031 | A1 | 5/2010 | Weber |
| 2012/0175438 | A1 | 7/2012 | Ji et al. |
| 2013/0048274 | A1 | 2/2013 | Schultz et al. |
| 2014/0103134 | A1 | 4/2014 | Raghu |
| 2016/0030954 | A1 | 2/2016 | Gopalan et al. |
| 2016/0052621 | A1 | 2/2016 | Ireland et al. |
| 2016/0243562 | A1 | 8/2016 | Koklu |
| 2016/0318602 | A1 | 11/2016 | Whalen et al. |
| 2017/0216852 | A1 | 8/2017 | Gopalan et al. |
| 2017/0326560 | A1 | 11/2017 | Kanda |
| 2018/0281930 | A1 | 10/2018 | Koklu et al. |
| 2018/0370617 | A1 | 12/2018 | Raghu |
| 2019/0145441 | A1 | 5/2019 | Tomac et al. |
| 2020/0038884 | A1 | 2/2020 | Wintering et al. |
| 2020/0306771 | A1 | 10/2020 | Tomac et al. |
| 2020/0376503 | A1 | 12/2020 | Wintering et al. |

FOREIGN PATENT DOCUMENTS

| | | | |
|---|---|---|---|
| EP | 2554854 | | 2/2013 |
| EP | 2708426 | A1 | 3/2014 |
| JP | 2005-247187 | A | 9/2005 |
| JP | 2013-001246 | A | 1/2013 |
| WO | 80/00927 | | 5/1980 |
| WO | 2007/149436 | A1 | 12/2007 |
| WO | 2008/135967 | | 11/2008 |
| WO | 2016/025858 | A1 | 2/2016 |
| WO | 2016/161349 | A1 | 10/2016 |
| WO | 2017/194525 | | 11/2017 |
| WO | 2018/197231 | | 11/2018 |
| WO | 2019/108628 | | 6/2019 |
| WO | 2020/243274 | | 12/2020 |
| WO | 2021/096515 | | 5/2021 |
| WO | 2021/145905 | | 7/2021 |

OTHER PUBLICATIONS

European Patent Office. Extended European Search Report, issued in European Application No. 20813670.5 on May 22, 2023. 9 pages.

Culley, Dennis. "Variable frequency diverter actuation for flow control." 3rd AIAA Flow Control Conference. Jun. 5-8, 2006. San Francisco, CA. 12 pages.

Deere, Karen et al. "A Computational Study of a Dual Throat Fluidic Thrust Vectoring Nozzle Concept." 41st AIAA/ASME/SAE/ASEE Joint Propulsion Conference & Exhibit. 2005. 16 pages.

Deere, Karen. "Summary of fluidic thrust vectoring research at NASA Langley Research Center." 21st AIAA applied aerodynamics conference. Jun. 23-26, 2003. Orlando, FL. 18 pages.

Gokoglu, S. A., Kuczmarski, M. A., Culley, D. E., and Raghu, S., 2011, "Numerical studies of an array of fluidic diverter actuators for flow control," AIAA-2011-3100, Proceedings of the 41st AIAA Fluid Dynamics Conference and Exhibit, Honolulu, HI.

Gregory, James W. et al. "Variable-frequency fluidic oscillator driven by a piezoelectric bender." AIAA journal 47.11 (2009): 2717-2725.

European Patent Office. Extended European Search Report, issued in European Application No. 18883610.0 on Jul. 16, 2021. 8 pages.

International Search Report and Written Opinion issued by the International Searching Authority (ISA/EP) in PCT Application No. PCT/US2019/061505 on Aug. 3, 2020. 12 pages.

International Search Report and Written Opinion issued by the International Searching Authority (ISA/US) in PCT Application No. No. PCT/US2020/034882 on Nov. 17, 2020. 12 pages.

International Search Report and Written Opinion issued by the International Searching Authority (ISA/EP) in PCT Application No. PCT/US2020/017249 on Feb. 12, 2021. 23 pages.

International Search Report and Written Opinion issued by the International Searching Authority (ISA/US) in PCT Application No. PCT/US2018/062812 on Feb. 21, 2019. 10 pages.

Invitation to Pay Additional Fees and Communication Relating to the Results of the Partial International Search, issued by the International Searching Authority (ISA/EP) in PCT Application No. PCT/US2020/017249 on Dec. 10, 2020. 16 pages.

Shigeta, M., Miura, T., Izawa, S., and Fukunishi, Y., 2009, "Active Control of Cavity Noise by Fluidic Oscillators," Theoretical and Applied Mechanics Japan, vol. 57, pp. 127-134.

Tesa, V., Zhong, S., and Rasheed, F., 2013, "New Fluidic-Oscillator Concept for Flow-Separation Control," AIAA Journal, vol. 51, No. 2, pp. 397-405.

Tomac, Mehmet N. "Effect of Geometry Modifications on the Vectoring Performance of a Controlled Jet." Journal of Applied Fluid Mechanics, 10 (1), 2017. 9 pages.

U.S. Patent & Trademark Office. Non-Final Office Action. U.S. Appl. No. 16/767,847, filed Nov. 17, 2022. 8 pages.

U.S. Patent & Trademark Office. Restriction Requirement. U.S. Appl. No. 16/767,847, filed Sep. 22, 2022. 6 pages.

European Patent Office. Communication under Rule 71(3). Issued in European Application No. 19817513.5 on Mar. 27, 2023. 63 pages.

U.S. Patent & Trademark Office. Non-Final Office Action. U.S. Appl. No. 17/614,135, filed Mar. 17, 2023. 45 pages.

U.S. Patent & Trademark Office. Final Office Action. U.S. Appl. No. 16/767,847, filed May 12, 2023. 14 pages.

Non-Final Office Action for U.S. Appl. No. 18/595,857 dated Dec. 2, 2024, 10 pages.

International Searching Authority (ISA/EP). International Search Report and Written Opinion, issued in PCT Application No. PCT/US2019/061506 on Aug. 24, 2020. 16 pages.

U.S. Patent & Trademark Office. Notice of Allowance. U.S. Appl. No. 17/614,135, filed Aug. 21, 2023. 16 pages.

Japanese Patent Office. Office Action issued in JP Application No. 2022-528052 on Aug. 16, 2023. 5 pages, Including English translation.

(56) References Cited

OTHER PUBLICATIONS

U.S. Patent & Trademark Office. Office Action. U.S. Appl. No. 16/767,847, filed Aug. 29, 2023. 10 pages.
Japanese Patent Office. Office Action issued in JP Application No. 2022-528015 on Nov. 7, 2023. 4 pages, including English translation.
European Patent Office. Communication under Rule 71(3) EPC issued in European Application No. 18883610.0 on Oct. 9, 2023. 8 pages.
European Patent Office. Extended European Search Report. Issued in EP Application No. 23192325.1 on Jul. 9, 2024. 8 pages.
European Patent Office. Extended European Search Report. Issued in EP Application No. 24161081.5 on Jun. 19, 2024. 9 pages.
Office Action for U.S. Appl. No. 17/776,908 dated Oct. 28, 2024.
Final Office Action for U.S. Appl. No. 18/595,857 dated Apr. 1, 2025, 9 pages.
Non-Final Office Action for U.S. Appl. No. 17/792,129 dated May 23, 2025, 11 pages.

* cited by examiner

FLUIDIC OSCILLATOR DEVICE WITH ATOMIZED OUTPUT

CROSS-REFERENCE TO RELATED APPLICATIONS

This application is a national stage application filed under 35 U.S.C. § 371 of PCT/US2019/061506 filed Nov. 14, 2019, which is fully incorporated by reference and made a part hereof.

BACKGROUND

Atomizing can be produced by colliding of two fluid jets to generate very fine particles. Atomizing is useful for many purposes such as fuel injectors and other spraying applications. Current atomizers include at least two fluid streams structured to collide with each other but current atomizers suffer from the fact that the spray generated from the collision is directed mainly along the collision point and is nearly two-dimensional with very little spray in the third dimension.

Thus, there is a desire for an atomizing device that produces an atomized output in all three dimensions to create a wider spray angle.

SUMMARY

Various implementations include a feedback type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator include an interaction chamber, a fluid supply inlet, an outlet nozzle, a first feedback channel, and a second feedback channel.

The interaction chamber has a first surface, a second surface opposite and spaced apart from the first surface, an interaction chamber plane disposed equally distanced from the first surface and the second surface, and a first attachment wall and a second attachment wall extending between the first surface and the second surface. The first attachment wall and the second attachment wall are opposite and spaced apart from each other. The fluid supply inlet is for introducing a fluid stream into the interaction chamber. The outlet nozzle is downstream of the fluid supply inlet. The fluid stream exits the interaction chamber through the outlet nozzle.

The first feedback channel is coupled to the first attachment wall, and the second feedback channel is coupled to the second attachment wall. The first feedback channel and second feedback channel are in fluid communication with the interaction chamber. Each of the first feedback channel and second feedback channel have a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber.

The first feedback channel of the first fluidic oscillator and the first feedback channel of the second fluidic oscillator share a common intermediate portion such that the first feedback channels are in fluid communication with each other, causing the fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the fluid streams exiting the outlet nozzle of the first fluidic oscillator and the outlet nozzle of the second fluidic oscillator collide with each other.

In some implementations, the second feedback channel of the first fluidic oscillator and the second feedback channel of the second fluidic oscillator share a common intermediate portion such that the second feedback channels are in fluid communication with each other.

In some implementations, the outlet nozzle of the first fluidic oscillator has a central axis, and the central axis of the outlet nozzle plane of the first fluidic oscillator is disposed at a first angle to the interaction chamber plane of the first fluidic oscillator. The first angle is between 0 and 90 degrees. In some implementations, the outlet nozzle of the second fluidic oscillator has a central axis, and the central axis of the outlet nozzle plane of the second fluidic oscillator is disposed at a second angle to the interaction chamber plane of the second fluidic oscillator. The second angle is between 0 and 90 degrees.

In some implementations, the interaction chamber plane of the first fluidic oscillator is at an angle to the interaction chamber plane of the second fluidic oscillator. The angle is between 0 and 180 degrees. A distance between the outlet nozzles is shorter than a distance between the fluid supply inlets.

In some implementations, the outlet nozzle of the first fluidic oscillator has a central axis and an axis of rotation, and at least a portion of the central axis of the outlet nozzle plane of the first fluidic oscillator extends circumferentially around the axis of rotation of the outlet nozzle plane of the first fluidic oscillator. In some implementations, the outlet nozzle of the second fluidic oscillator has a central axis and an axis of rotation, and at least a portion of the central axis of the outlet nozzle plane of the second fluidic oscillator extends circumferentially around the axis of rotation of the outlet nozzle plane of the second fluidic oscillator.

In some implementations, the first fluidic oscillator has an axis of rotation, and at least a portion of the interaction chamber plane of the first fluidic oscillator extends circumferentially around the axis of rotation of the first fluidic oscillator. In some implementations, the second fluidic oscillator has an axis of rotation, and at least a portion of the interaction chamber plane of the second fluidic oscillator extends circumferentially around the axis of rotation of the second fluidic oscillator.

In some implementations, the outlet nozzle of the first fluidic oscillator includes at least one first control port for introducing fluid into, or suctioning fluid from, the outlet nozzle of the first fluidic oscillator to redirect the fluid stream exiting the outlet nozzle of the first fluidic oscillator. In some implementations, the outlet nozzle of the second fluidic oscillator includes at least one second control port for introducing fluid into, or suctioning fluid from, the outlet nozzle of the second fluidic oscillator to redirect the fluid stream exiting the outlet nozzle of the second fluidic oscillator.

In some implementations, the first fluidic oscillator includes a hinging portion for changing an angle of the fluid stream exiting the outlet nozzle of the first fluidic oscillator relative to the fluid stream exiting the outlet nozzle of the second fluidic oscillator. In some implementations, the second fluidic oscillator includes a hinging portion for changing an angle of the fluid stream exiting the outlet nozzle of the second fluidic oscillator relative to the fluid stream exiting the outlet nozzle of the first fluidic oscillator.

Various other implementations include a feedback type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator include an interaction chamber, a fluid supply inlet, an outlet nozzle, a first feedback channel, and a second feedback channel.

The interaction chamber has a first surface, a second surface opposite and spaced apart from the first surface, an interaction chamber plane disposed equally distanced from the first surface and the second surface, and a first attachment wall and a second attachment wall extending between the first surface and the second surface. The first attachment wall and the second attachment wall are opposite and spaced apart from each other. The fluid supply inlet is for introducing a fluid stream into the interaction chamber. The outlet nozzle is downstream of the fluid supply inlet. The fluid stream exits the interaction chamber through the outlet nozzle.

The first feedback channel is coupled to the first attachment wall, and the second feedback channel is coupled to the second attachment wall. The first feedback channel and second feedback channel are in fluid communication with the interaction chamber. Each of the first feedback channel and second feedback channel has a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber.

The first feedback channel of the first fluidic oscillator and the first feedback channel of the second fluidic oscillator share a common first end and a common second end such that the first feedback channels are in fluid communication with each other, causing the fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the fluid streams exiting the outlet nozzle of the first fluidic oscillator and the outlet nozzle of the second fluidic oscillator collide with each other.

In some implementations, the second feedback channel of the first fluidic oscillator and the second feedback channel of the second fluidic oscillator share a common first end and a common second end such that the second feedback channels are in fluid communication with each other.

In some implementations, the outlet nozzle of the first fluidic oscillator has a central axis, and the central axis of the outlet nozzle plane of the first fluidic oscillator is disposed at a first angle to the interaction chamber plane of the first fluidic oscillator. The first angle is between 0 and 90 degrees. In some implementations, the outlet nozzle of the second fluidic oscillator has a central axis, and the central axis of the outlet nozzle plane of the second fluidic oscillator is disposed at a second angle to the interaction chamber plane of the second fluidic oscillator. The second angle is between 0 and 90 degrees.

In some implementations, the interaction chamber plane of the first fluidic oscillator is at an angle to the interaction chamber plane of the second fluidic oscillator. The angle is between 0 and 180 degrees. A distance between the outlet nozzles is shorter than a distance between the fluid supply inlets.

In some implementations, the outlet nozzle of the first fluidic oscillator has a central axis and an axis of rotation, and at least a portion of the central axis of the outlet nozzle plane of the first fluidic oscillator extends circumferentially around the axis of rotation of the outlet nozzle plane of the first fluidic oscillator. In some implementations, the outlet nozzle of the second fluidic oscillator has a central axis and an axis of rotation, and at least a portion of the central axis of the outlet nozzle plane of the second fluidic oscillator extends circumferentially around the axis of rotation of the outlet nozzle plane of the second fluidic oscillator.

In some implementations, the first fluidic oscillator has an axis of rotation, and at least a portion of the interaction chamber plane of the first fluidic oscillator extends circumferentially around the axis of rotation of the first fluidic oscillator. In some implementations, the second fluidic oscillator has an axis of rotation, and at least a portion of the interaction chamber plane of the second fluidic oscillator extends circumferentially around the axis of rotation of the second fluidic oscillator.

In some implementations, the outlet nozzle of the first fluidic oscillator includes at least one first control port for introducing fluid into, or suctioning fluid from, the outlet nozzle of the first fluidic oscillator to redirect the fluid stream exiting the outlet nozzle of the first fluidic oscillator. In some implementations, the outlet nozzle of the second fluidic oscillator includes at least one second control port for introducing fluid into, or suctioning fluid from, the outlet nozzle of the second fluidic oscillator to redirect the fluid stream exiting the outlet nozzle of the second fluidic oscillator.

In some implementations, the first fluidic oscillator includes a hinging portion for changing the angle of the fluid stream exiting the outlet nozzle of the first fluidic oscillator relative to the fluid stream exiting the outlet nozzle of the second fluidic oscillator. In some implementations, the second fluidic oscillator includes a hinging portion for changing an angle of the fluid stream exiting the outlet nozzle of the second fluidic oscillator relative to the fluid stream exiting the outlet nozzle of the first fluidic oscillator.

Various other implementations include a jet-interaction type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator includes an interaction chamber, a first fluid supply inlet, a second fluid supply inlet, and an outlet nozzle.

The interaction chamber has a first surface, a second surface opposite and spaced apart from the first surface, an interaction chamber plane disposed equally distanced from the first surface and the second surface, and a chamber wall extending between the first surface and the second surface. The chamber wall defines a first inlet port, a second inlet port, and an outlet port. The interaction chamber has a back vortex region located adjacent a portion of the chamber wall between the first inlet port and the second inlet port, a first side vortex region located adjacent a portion of the chamber wall between the first inlet port and the outlet port, and a second side vortex region located adjacent a portion of the chamber wall between the second inlet port and the outlet port. The first fluid supply inlet is configured to introduce a first inlet fluid stream through the first inlet port and into the interaction chamber. The second fluid supply inlet is configured to introduce a second inlet fluid stream through the second inlet port and into the interaction chamber. The outlet nozzle is configured to discharge an outlet fluid stream from the interaction chamber through the outlet port and the outlet nozzle.

The first inlet fluid stream collides with the second inlet fluid stream within the interaction chamber. The collision of the first inlet fluid stream with the second inlet fluid stream causes the first outlet fluid stream to oscillate from side to side as the outlet fluid stream is discharged from the outlet nozzle. The interaction chamber of the first fluidic oscillator and the interaction chamber of the second fluidic oscillator share a common back vortex region such that the interaction chambers are in fluid communication with each other, causing the outlet fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the outlet fluid streams exiting the outlet nozzle of the first fluidic oscillator and the outlet nozzle of the second fluidic oscillator collide with each other.

In some implementations, the outlet nozzle of the first fluidic oscillator has a central axis, and the central axis of the outlet nozzle plane of the first fluidic oscillator is disposed at a first angle to the interaction chamber plane of the first fluidic oscillator. The first angle is between 0 and 90 degrees. In some implementations, the outlet nozzle of the second fluidic oscillator has a central axis, and the central axis of the outlet nozzle plane of the second fluidic oscillator is disposed at a second angle to the interaction chamber plane of the second fluidic oscillator. The second angle is between 0 and 90 degrees.

In some implementations, the interaction chamber plane of the first fluidic oscillator is at an angle to the interaction chamber plane of the second fluidic oscillator. The angle is between 0 and 180 degrees. A distance between the outlet nozzles is shorter than a distance between the first inlet port and the distance between the outlet nozzles is shorter than a distance between the second inlet port.

In some implementations, the outlet nozzle of the first fluidic oscillator has a central axis and an axis of rotation, and at least a portion of the central axis of the outlet nozzle plane of the first fluidic oscillator extends circumferentially around the axis of rotation of the outlet nozzle plane of the first fluidic oscillator. In some implementations, the outlet nozzle of the second fluidic oscillator has a central axis and an axis of rotation, and at least a portion of the central axis of the outlet nozzle plane of the second fluidic oscillator extends circumferentially around the axis of rotation of the outlet nozzle plane of the second fluidic oscillator.

In some implementations, the outlet nozzle of the first fluidic oscillator includes at least one first control port for introducing fluid into, or suctioning fluid from, the outlet nozzle of the first fluidic oscillator to redirect the outlet fluid stream exiting the outlet nozzle of the first fluidic oscillator. In some implementations, the outlet nozzle of the second fluidic oscillator includes at least one second control port for introducing fluid into, or suctioning fluid from, the outlet nozzle of the second fluidic oscillator to redirect the outlet fluid stream exiting the outlet nozzle of the second fluidic oscillator.

In some implementations, the first fluidic oscillator includes a hinging portion for changing the angle of the fluid stream exiting the outlet nozzle of the first fluidic oscillator relative to the fluid stream exiting the outlet nozzle of the second fluidic oscillator. In some implementations, the second fluidic oscillator includes a hinging portion for changing the angle of the fluid stream exiting the outlet nozzle of the second fluidic oscillator relative to the fluid stream exiting the outlet nozzle of the first fluidic oscillator.

Various other implementations include a jet-interaction type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator includes an interaction chamber, a first fluid supply inlet, a second fluid supply inlet, and an outlet nozzle.

The interaction chamber has a first surface, a second surface opposite and spaced apart from the first surface, an interaction chamber plane disposed equally distanced from the first surface and the second surface, and a chamber wall extending between the first surface and the second surface. The chamber wall defines a first inlet port, a second inlet port, and an outlet port. The interaction chamber has a back vortex region located adjacent a portion of the chamber wall between the first inlet port and the second inlet port, a first side vortex region located adjacent a portion of the chamber wall between the first inlet port and the outlet port, and a second side vortex region located adjacent a portion of the chamber wall between the second inlet port and the outlet port. The first fluid supply inlet is configured to introduce a first inlet fluid stream through the first inlet port and into the interaction chamber. The second fluid supply inlet is configured to introduce a second inlet fluid stream through the second inlet port and into the interaction chamber. The outlet nozzle is configured to discharge an outlet fluid stream from the interaction chamber through the outlet port and the outlet nozzle.

The first inlet fluid stream collides with the second inlet fluid stream within the interaction chamber. The collision of the first inlet fluid stream with the second inlet fluid stream causes the first outlet fluid stream to oscillate from side to side as the outlet fluid stream is discharged from the outlet nozzle. The interaction chamber of the first fluidic oscillator and the interaction chamber of the second fluidic oscillator share a common first side vortex region and a common second side vortex region such that the interaction chambers are in fluid communication with each other, causing the outlet fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the outlet fluid streams exiting the outlet nozzle of the first fluidic oscillator and the outlet nozzle of the second fluidic oscillator collide with each other.

In some implementations, the outlet nozzle of the first fluidic oscillator has a central axis, and the central axis of the outlet nozzle plane of the first fluidic oscillator is disposed at a first angle to the interaction chamber plane of the first fluidic oscillator. The first angle is between 0 and 90 degrees. In some implementations, the outlet nozzle of the second fluidic oscillator has a central axis, and the central axis of the outlet nozzle plane of the second fluidic oscillator is disposed at a second angle to the interaction chamber plane of the second fluidic oscillator. The second angle is between 0 and 90 degrees.

In some implementations, the interaction chamber plane of the first fluidic oscillator is at an angle to the interaction chamber plane of the second fluidic oscillator. The angle is between 0 and 180 degrees. A distance between the outlet nozzles is shorter than a distance between the first inlet port and the distance between the outlet nozzles is shorter than a distance between the second inlet port.

In some implementations, the outlet nozzle of the first fluidic oscillator has a central axis and an axis of rotation, and at least a portion of the central axis of the outlet nozzle plane of the first fluidic oscillator extends circumferentially around the axis of rotation of the outlet nozzle plane of the first fluidic oscillator. In some implementations, the outlet nozzle of the second fluidic oscillator has a central axis and an axis of rotation, and at least a portion of the central axis of the outlet nozzle plane of the second fluidic oscillator extends circumferentially around the axis of rotation of the outlet nozzle plane of the second fluidic oscillator.

In some implementations, the outlet nozzle of the first fluidic oscillator includes at least one first control port for introducing fluid into, or suctioning fluid from, the outlet nozzle of the first fluidic oscillator to redirect the outlet fluid stream exiting the outlet nozzle of the first fluidic oscillator. In some implementations, the outlet nozzle of the second fluidic oscillator includes at least one second control port for introducing fluid into, or suctioning fluid from, the outlet nozzle of the second fluidic oscillator to redirect the outlet fluid stream exiting the outlet nozzle of the second fluidic oscillator.

In some implementations, the first fluidic oscillator includes a hinging portion for changing the angle of the fluid stream exiting the outlet nozzle of the first fluidic oscillator relative to the fluid stream exiting the outlet nozzle of the second fluidic oscillator. In some implementations, the second fluidic oscillator includes a hinging portion for changing the angle of the fluid stream exiting the outlet nozzle of the second fluidic oscillator relative to the fluid stream exiting the outlet nozzle of the first fluidic oscillator.

BRIEF DESCRIPTION OF DRAWINGS

Example features and implementations are disclosed in the accompanying drawings. However, the present disclosure is not limited to the precise arrangements and instrumentalities shown. Similar elements in different implementations are designated using the same reference numerals.

DETAILED DESCRIPTION

Figure 1A:
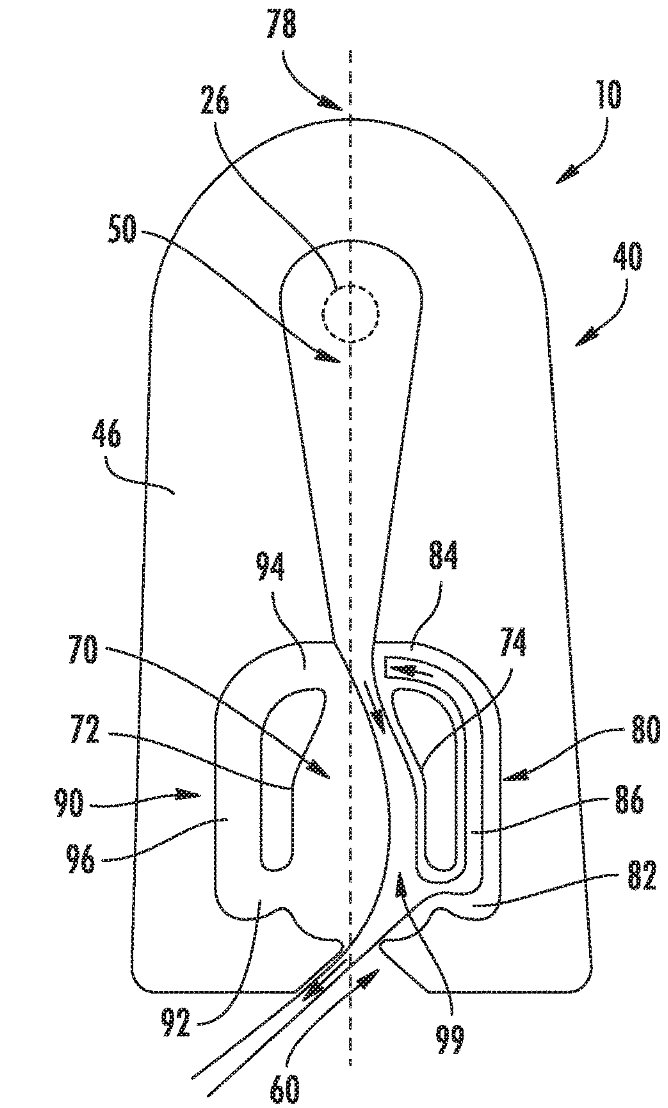
FIG. 1A (PRIOR ART)
FIG. 1A is a top view of a single feedback-type fluidic oscillator of the prior art.

Various implementations include a feedback type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator include an interaction chamber, a fluid supply inlet, an outlet nozzle, a first feedback channel, and a second feedback channel.

The interaction chamber has a first surface, a second surface opposite and spaced apart from the first surface, an interaction chamber plane disposed equally distanced from the first surface and the second surface, and a first attachment wall and a second attachment wall extending between the first surface and the second surface. The first attachment wall and the second attachment wall are opposite and spaced apart from each other. The fluid supply inlet is for introducing a fluid stream into the interaction chamber. The outlet nozzle is downstream of the fluid supply inlet. The fluid stream exits the interaction chamber through the outlet nozzle.

The first feedback channel is coupled to the first attachment wall, and the second feedback channel is coupled to the second attachment wall. The first feedback channel and second feedback channel are in fluid communication with the interaction chamber. Each of the first feedback channel and second feedback channel have a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber.

The first feedback channel of the first fluidic oscillator and the first feedback channel of the second fluidic oscillator share a common intermediate portion such that the first feedback channels are in fluid communication with each other, causing the fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the fluid streams exiting the outlet nozzle of the first fluidic oscillator and the outlet nozzle of the second fluidic oscillator collide with each other.

Various other implementations include a feedback type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator include an interaction chamber, a fluid supply inlet, an outlet nozzle, a first feedback channel, and a second feedback channel.

The interaction chamber has a first surface, a second surface opposite and spaced apart from the first surface, an interaction chamber plane disposed equally distanced from the first surface and the second surface, and a first attachment wall and a second attachment wall extending between the first surface and the second surface. The first attachment wall and the second attachment wall are opposite and spaced apart from each other. The fluid supply inlet is for introducing a fluid stream into the interaction chamber. The outlet nozzle is downstream of the fluid supply inlet. The fluid stream exits the interaction chamber through the outlet nozzle.

The first feedback channel is coupled to the first attachment wall, and the second feedback channel is coupled to the second attachment wall. The first feedback channel and second feedback channel are in fluid communication with the interaction chamber. Each of the first feedback channel and second feedback channel has a first end, a second end opposite and spaced apart from the first end, and an intermediate portion disposed between the first end and second end. The first end is adjacent the outlet nozzle, and the second end is adjacent the fluid supply inlet. The first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber.

The first feedback channel of the first fluidic oscillator and the first feedback channel of the second fluidic oscillator share a common first end and a common second end such that the first feedback channels are in fluid communication with each other, causing the fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the fluid streams exiting the outlet nozzle of the first fluidic oscillator and the outlet nozzle of the second fluidic oscillator collide with each other.

Various other implementations include a jet-interaction type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator includes an interaction chamber, a first fluid supply inlet, a second fluid supply inlet, and an outlet nozzle.

The interaction chamber has a first surface, a second surface opposite and spaced apart from the first surface, an interaction chamber plane disposed equally distanced from the first surface and the second surface, and a chamber wall extending between the first surface and the second surface. The chamber wall defines a first inlet port, a second inlet port, and an outlet port. The interaction chamber has a back vortex region located adjacent a portion of the chamber wall between the first inlet port and the second inlet port, a first side vortex region located adjacent a portion of the chamber wall between the first inlet port and the outlet port, and a second side vortex region located adjacent a portion of the chamber wall between the second inlet port and the outlet port. The first fluid supply inlet is configured to introduce a first inlet fluid stream through the first inlet port and into the interaction chamber. The second fluid supply inlet is configured to introduce a second inlet fluid stream through the second inlet port and into the interaction chamber. The outlet nozzle is configured to discharge an outlet fluid stream from the interaction chamber through the outlet port and the outlet nozzle.

The first inlet fluid stream collides with the second inlet fluid stream within the interaction chamber. The collision of the first inlet fluid stream with the second inlet fluid stream causes the first outlet fluid stream to oscillate from side to side as the outlet fluid stream is discharged from the outlet nozzle. The interaction chamber of the first fluidic oscillator and the interaction chamber of the second fluidic oscillator share a common back vortex region such that the interaction chambers are in fluid communication with each other, causing the outlet fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the outlet fluid streams exiting the outlet nozzle of the first fluidic oscillator and the outlet nozzle of the second fluidic oscillator collide with each other.

Various other implementations include a jet-interaction type fluidic oscillator device with atomized output. The device includes at least two fluidic oscillators. The at least two fluidic oscillators include a first fluidic oscillator and a second fluidic oscillator. Each of the first fluidic oscillator and second fluidic oscillator includes an interaction chamber, a first fluid supply inlet, a second fluid supply inlet, and an outlet nozzle.

The interaction chamber has a first surface, a second surface opposite and spaced apart from the first surface, an interaction chamber plane disposed equally distanced from the first surface and the second surface, and a chamber wall extending between the first surface and the second surface. The chamber wall defines a first inlet port, a second inlet port, and an outlet port. The interaction chamber has a back vortex region located adjacent a portion of the chamber wall between the first inlet port and the second inlet port, a first side vortex region located adjacent a portion of the chamber wall between the first inlet port and the outlet port, and a second side vortex region located adjacent a portion of the chamber wall between the second inlet port and the outlet port. The first fluid supply inlet is configured to introduce a first inlet fluid stream through the first inlet port and into the interaction chamber. The second fluid supply inlet is configured to introduce a second inlet fluid stream through the second inlet port and into the interaction chamber. The outlet nozzle is configured to discharge an outlet fluid stream from the interaction chamber through the outlet port and the outlet nozzle.

The first inlet fluid stream collides with the second inlet fluid stream within the interaction chamber. The collision of the first inlet fluid stream with the second inlet fluid stream causes the first outlet fluid stream to oscillate from side to side as the outlet fluid stream is discharged from the outlet nozzle. The interaction chamber of the first fluidic oscillator and the interaction chamber of the second fluidic oscillator share a common first side vortex region and a common second side vortex region such that the interaction chambers are in fluid communication with each other, causing the outlet fluid streams exiting the outlet nozzles of the first fluidic oscillator and second fluidic oscillator to oscillate in phase with each other. The outlet nozzle of the first fluidic oscillator and the outlet nozzle of the second fluidic oscillator are structured such that the outlet fluid streams exiting the outlet nozzle of the first fluidic oscillator and the outlet nozzle of the second fluidic oscillator collide with each other.

The devices, systems, and methods disclosed herein provide for continuous atomization of two or more oscillating fluid streams. When two or more fluid streams collide with each other, the fluid streams break apart into small droplets, which is called atomizing. The devices, systems, and methods include features that cause the output fluid streams of the two or more fluidic oscillators to be directed toward each other such that the fluid streams are atomized as they collide. Furthermore, devices, systems, and methods include features for synchronizing the oscillations of the output fluid streams of the two or more fluidic oscillators. Thus, the devices, systems, and methods disclosed herein are synchronized in phase with each other to allow the output fluid streams to continuously collide.

The ability to synchronize the oscillation of multiple fluidic oscillators in a single device is correlated with the level of understanding of the internal operation of a single fluidic oscillator. For a device having multiple fluidic oscillators acting as unsteady vortex-generating jets, it is beneficial to carefully control the phasing between adjacent oscillators, since adjacent regions of streamwise vorticity may interact in a destructive manner if vorticity production is not synchronized. When the fluidic oscillators are not synchronized they randomly generate vortices and there is no order to this generation. However, before discussing how two or more feedback-type fluidic oscillators can be controlled to produce in-phase oscillations, it is helpful to understand how a single feedback-type fluidic oscillator produces an oscillating output fluid stream.

Figure 1B:
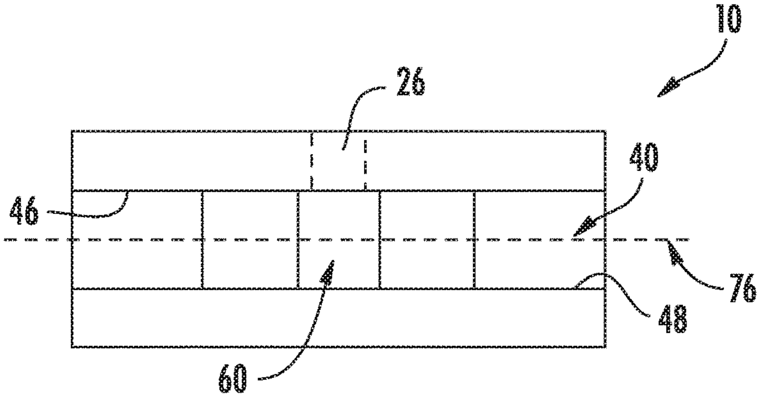
FIG. 1B (PRIOR ART)
FIG. 1B is an end view of the single feedback-type fluidic oscillator of FIG. 1A.
Figure 2A:
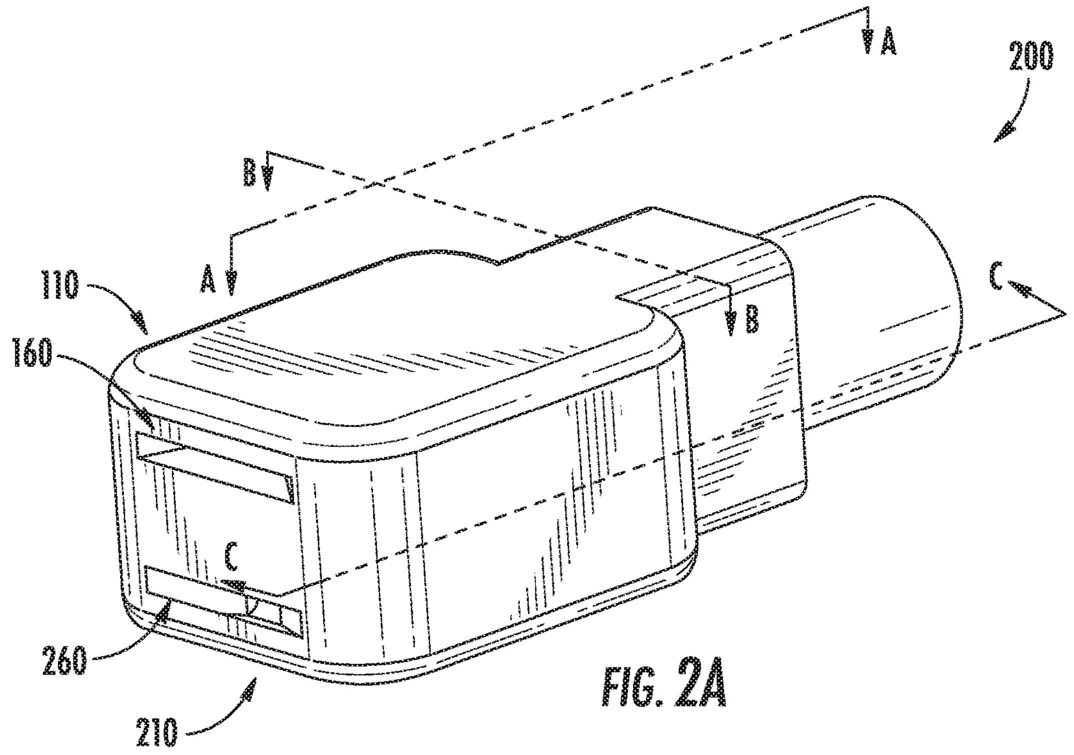
FIG. 2A is a perspective view of a feedback type fluidic oscillator device with atomized output, according to one implementation.
Figure 2B:
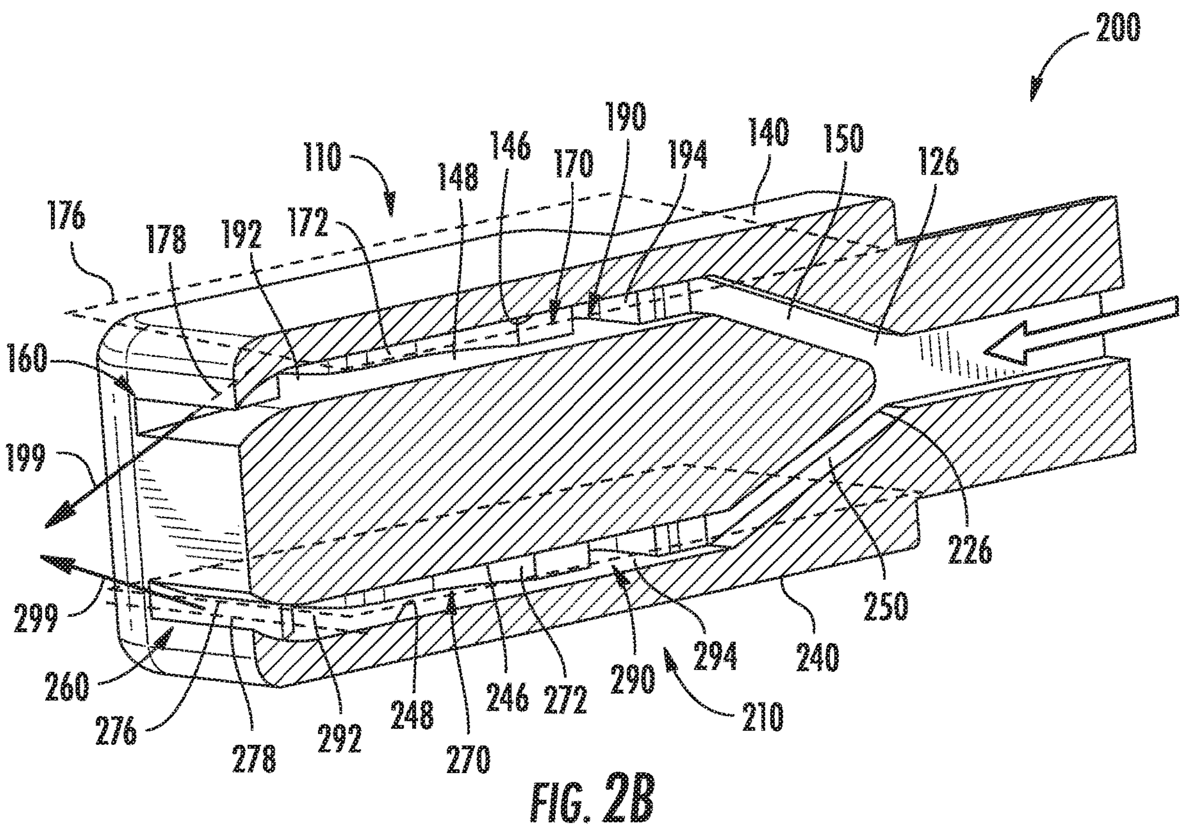
FIG. 2B is a cross-sectional view of the device of FIG. 2A along line A-A.
Figure 2C:
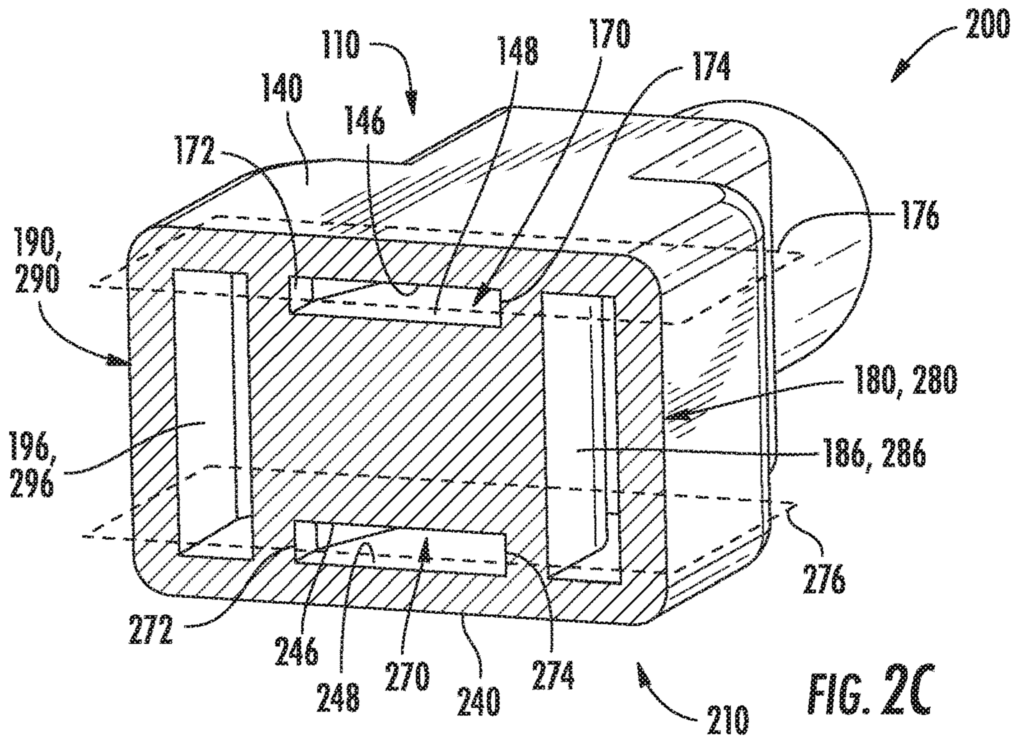
FIG. 2C is a cross-sectional view of the device of FIG. 2A along line B-B.
Figure 2D:
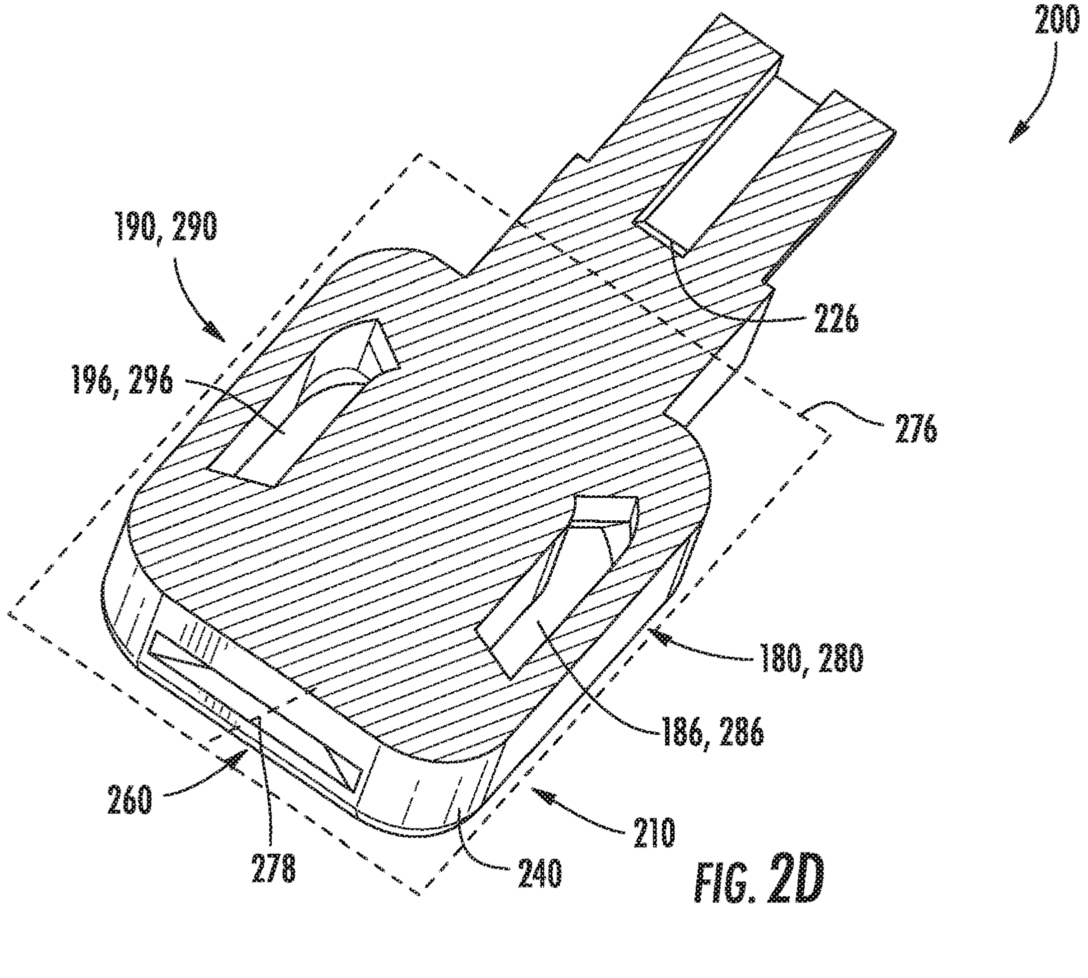
FIG. 2D is a cross-sectional view of the device of FIG. 2A along line C-C.

FIG. 1A shows a top view of a single fluidic oscillator 10 of the prior art, and FIG. 1B shows an end view of the single fluidic oscillator 10 as viewed from the outlet nozzle 60. The fluidic oscillator 10 includes a body 40 defining an interaction chamber 70, a fluid supply inlet 50, an outlet nozzle 60, a first feedback channel 90, and a second feedback channel 80.

The interaction chamber 70 has a first surface 46, a second surface 48 opposite and spaced apart from the first surface 46, and an interaction chamber plane 76 disposed equally distanced from the first surface 46 and the second surface 48. The interaction chamber 70 is also defined by a first attachment wall 72 and a second attachment wall 74 extending between the first surface 46 and the second surface 48. The first attachment wall 72 and the second attachment wall 74 are opposite and spaced apart from each other. The first attachment wall 72 and second attachment wall 74 mirror each other across a plane perpendicular to the interaction chamber plane 76. Each attachment wall 72, 74 has a curvature such that the first attachment wall 72 and second attachment wall 74 are closer to each other adjacent the fluid supply inlet 50 than adjacent the outlet nozzle 60, as discussed below.

The fluid supply inlet 50 of the body 40 is in fluid communication with the interaction chamber 70, and an inlet port 26 is aligned with the fluid supply inlet 50 such that the inlet port 26, the fluid supply inlet 50, and the interaction chamber 70 are in fluid communication with each other. In use, a fluid stream 99 is introduced from the inlet port 26, into for fluid supply inlet 50, and into the interaction chamber 70.

The outlet nozzle 60 of the body 40 is in fluid communication with the interaction chamber 70 and is located downstream of the fluid supply inlet 50. The outlet nozzle also includes a central axis 78 extending from the interaction chamber 70 to the exiting end of the outlet nozzle 60. In use, the fluid stream 99 exits the interaction chamber 70 through the outlet nozzle 60.

The first feedback channel 90 and the second feedback channel 80 each have a first end 92, 82, a second end 94, 84 opposite and spaced apart from the first end 92, 82, and an intermediate portion 96, 86 disposed between the first end 92, 82 and second end 94, 84. The first feedback channel 90 is coupled to the first attachment wall 72 and the second feedback channel 80 is coupled to the second attachment wall 74 such that both the first feedback channel 90 and the second feedback channel 80 are in fluid communication with the interaction chamber 70. The first end 92, 82 of both feedback channels 90, 80 is adjacent the outlet nozzle 60 such that the first ends 92, 82 of the feedback channels 90, 80 are closer than the second ends 94, 84 of the feedback channels 90, 80 to the outlet nozzle 60. The second end 94, 84 of both feedback channels 90, 80 is adjacent the fluid supply inlet 50 such that the second ends 94, 84 of the feedback channels 90, 80 are closer than the first ends 92, 82 of the feedback channels 90, 80 to the fluid supply inlet 50.

A fluid stream 99 enters the fluidic oscillator 10 through the inlet port 26 and flows through the fluid supply inlet 50, through the interaction chamber 70, and eventually exits the fluidic oscillator 10 through the outlet nozzle 60. The first attachment wall 72 and second attachment wall 74 of the interaction chamber 70 are a predetermined distance from each other such that, as the fluid stream 99 flows through the interaction chamber 70, a pressure difference across the fluid stream 99 causes the fluid stream 99 to deflect toward, and eventually attach to, either the first attachment wall 72 or the second attachment wall 74 due to the Coanda effect. The first attachment wall 72 and second attachment wall 74 of the interaction chamber 70 are shaped to allow fluid from the fluid stream 99 to flow into the first ends 92, 82 of the first feedback channel 90 and second feedback channel 80, respectively, when the fluid stream 99 is attached to that attachment wall 72, 74. The fluid stream 99 can include any fluid, for example, any liquid or gas.

When the fluid stream 99 is attached to the first attachment wall 72, fluid from the fluid stream 99 enters the first end 92 of the first feedback channel 90, flows through the intermediate portion 96 of the first feedback channel 90 and out of the second end 94 of the first feedback channel 90. The fluid exiting the second end 94 of the first feedback channel 90 contacts the fluid stream 99 adjacent the fluid supply inlet 50, causing the fluid stream 99 to detach from the first attachment wall 72 and attach to the second attachment wall 74. Fluid from the fluid stream 99 then enters the first end 82 of the second feedback channel 80, flows through the intermediate portion 86 of the second feedback channel 80 and out of the second end 84 of the second feedback channel 80. The fluid exiting the second end 84 of the second feedback channel 80 contacts the fluid stream 99 adjacent the fluid supply inlet 50, causing the fluid stream 99 to detach from the second attachment wall 74 and attach back to the first attachment wall 72. The fluid stream 99 continues to oscillate between attachment to the first attachment wall 72 and second attachment wall 74 of the interaction chamber 70.

Because of the shape of the outlet nozzle 60 and the curvature of the first attachment wall 72 and second attachment wall 74, the oscillation of the fluid stream 99 between the first attachment wall 72 and the second attachment wall 74 causes the fluid stream 99 to oscillate as the fluid stream 99 exits the fluidic oscillator 10 through the outlet nozzle 60.

FIGS. 2A-2D show a feedback type fluidic oscillator device 200 according to one implementation of the current application. The device 200 includes a first feedback type fluidic oscillator 110 and a second feedback type fluidic oscillator 210. Both the first fluidic oscillator 110 and the second fluidic oscillator 210 are similar to the fluidic oscillator 10 shown in FIG. 1, and thus, features of fluidic oscillators 110, 210 are indicated using similar reference numbers. The fluidic oscillators 110, 210 are stacked such that the second surface 148 of the first fluidic oscillator 110 is adjacent the first surface 246 of the second fluidic oscillator 210. The interaction plane 176 of the first fluidic oscillator 110 is parallel with the interaction chamber plane 276 of the second fluidic oscillator 210. In the device 200 of FIGS. 2A-2D, the first feedback channel 190 of the first fluidic oscillator 110 and the first feedback channel 290 of the second fluidic oscillator 210 share a common intermediate portion 196, 296 such that the adjacent feedback channels 190, 290 are in fluid communication with each other. Furthermore, the second feedback channel 180 of the first fluidic oscillator 110 and the second feedback channel 280 of the second fluidic oscillator 210 share a common intermediate portion 186, 286 such that the adjacent feedback channels 180, 280 are in fluid communication with each other.

The interaction planes 176, 276 of the device 200 shown in FIGS. 2A-2D are parallel to each other, but in other implementations, the interaction chamber planes are at any angle relative to each other. For the device 200 shown in FIGS. 2A-2D, the first feedback channels 190, 290 share a common intermediate portion 196, 296 and the second feedback channels 180, 280 share a common intermediate portion 186, 286, but in other implementations, the device only includes common first feedback channels or common second feedback channels. Although the device 200 shown in FIGS. 2A-2D includes directly shared first intermediate portions 196, 296 and directly shared second intermediate portions 186, 286, in other implementations, the intermediate portions can be distantly shared through tubing or additional channels such that the intermediate portions are in fluid communication with each other. The device 200 shown in FIGS. 2A-2D includes two fluidic oscillators 110, 210, but in other implementations, the device includes three or more fluidic oscillators.

When the fluid stream 199 in the first fluidic oscillator 110 attaches to the first attachment wall 172 such that fluid from the fluid stream 199 flows into the first end 192 of the first feedback channel 190, a portion of the fluid flows through the shared intermediate portions 196, 296 of the first feedback channels 190, 290 of the first and second fluidic oscillators 110, 210, through the second end 294 of the first feedback channel 290 of the second fluidic oscillator 210, and into the interaction chamber 270 of the second fluidic oscillator 210. The portion of fluid from the first fluidic oscillator 110 contacts the fluid stream 299 of the second fluidic oscillator 210, causing the fluid stream 299 of the second fluidic oscillator 210 to curve toward, and attach to, the first attachment wall 272 of the second fluidic oscillator 210. Thus, the fluid streams 199, 299 in both the first fluidic oscillator 110 and the second fluidic oscillator 210 are attached to their respective first attachment walls 172, 272.

Similarly, when the fluid stream 299 in the second fluidic oscillator 210 attaches to the second attachment wall 274 such that fluid from the fluid stream 299 flows into the first end 282 of the second feedback channel 280, a portion of the fluid flows through the shared intermediate portions 186, 286 of the second feedback channels 180, 280 of the first and second fluidic oscillators 110, 210, through the second end 184 of the second feedback channel 180 of the first fluidic oscillator 110, and into the interaction chamber 170 of the first fluidic oscillator 110, The portion of fluid from the second fluidic oscillator 210 contacts the fluid stream 199 of the first fluidic oscillator 110, causing the fluid stream 199 of the first fluidic oscillator 110 to curve toward, and attach to, the second attachment wall 174 of the first fluidic oscillator 110. Thus, the fluid streams 199, 299 in both the first fluidic oscillator 110 and the second fluidic oscillator 210 are attached to their respective second attachment walls 174, 274.

Because the attachment of the fluid stream 199, 299 to an attachment wall 172, 174, 272, 274 of one of the fluidic oscillators 110, 210 in the fluidic oscillator array 200 affects the timing of the attachment of the fluid stream 199, 299 to the attachment wall 172, 174, 272, 274 in the other fluidic oscillator 110, 210, the fluid streams 199, 299 inside the interaction chambers 170, 270 oscillate at the same frequency. The fluid streams 199, 299 inside the interaction chambers 170, 270 of the fluidic oscillators 110, 210 oscillating at the same frequency causes the fluid streams 199, 299 exiting the outlet nozzles 160, 260 of the first fluidic oscillator 110 and second fluidic oscillator 210 to also oscillate at the same frequency.

In FIGS. 2A-2D, the first fluidic oscillator 110 and the second fluidic oscillator 210 share a common intermediate portion 196, 296 of their respective first feedback channels 190, 290 and a common intermediate portion 186, 286 of their respective second feedback channels 180, 280, as discussed above. Thus, the fluid streams 199, 299 exiting the outlet nozzles 160, 260 of the first fluidic oscillator 110 and the second fluidic oscillator 210 oscillate in phase with each other such that the wave form of the exiting fluid streams 199, 299 reach their same respective apices simultaneously.

To create an atomized output, the outlet nozzle 160 of the first fluidic oscillator 110 and the outlet nozzle 260 of the second fluidic oscillator 210 are structured such that the fluid streams 199, 299 exiting the outlet nozzle 160 of the first fluidic oscillator 110 and the outlet nozzle 260 of the second fluidic oscillator 210 collide with each other. The outlet nozzles 160, 260 of the first fluidic oscillator 110 and the second fluidic oscillator 210 of the device 200 shown in FIGS. 2A-2D are angled toward each other such that the exiting fluid streams 199, 299 collide with each other after exiting the outlet nozzles 160, 260. The central axis 178 of the outlet nozzle 160 of the first fluidic oscillator 110 is disposed at a first angle 179 to the interaction chamber plane 176 of the first fluidic oscillator 110. Similarly, the central axis 278 of the outlet nozzle 260 of the second fluidic oscillator 210 is disposed at a second angle 279 to the interaction chamber plane 276 of the second fluidic oscillator 210. In FIGS. 2A-2D, the first angle 179 is 30 degrees and the second angle 279 is 30 degrees, but in other implementations, the first angle and the second angle are any other angle between 0 and 90 degrees and can be different angles than each other.

Figure 3A:
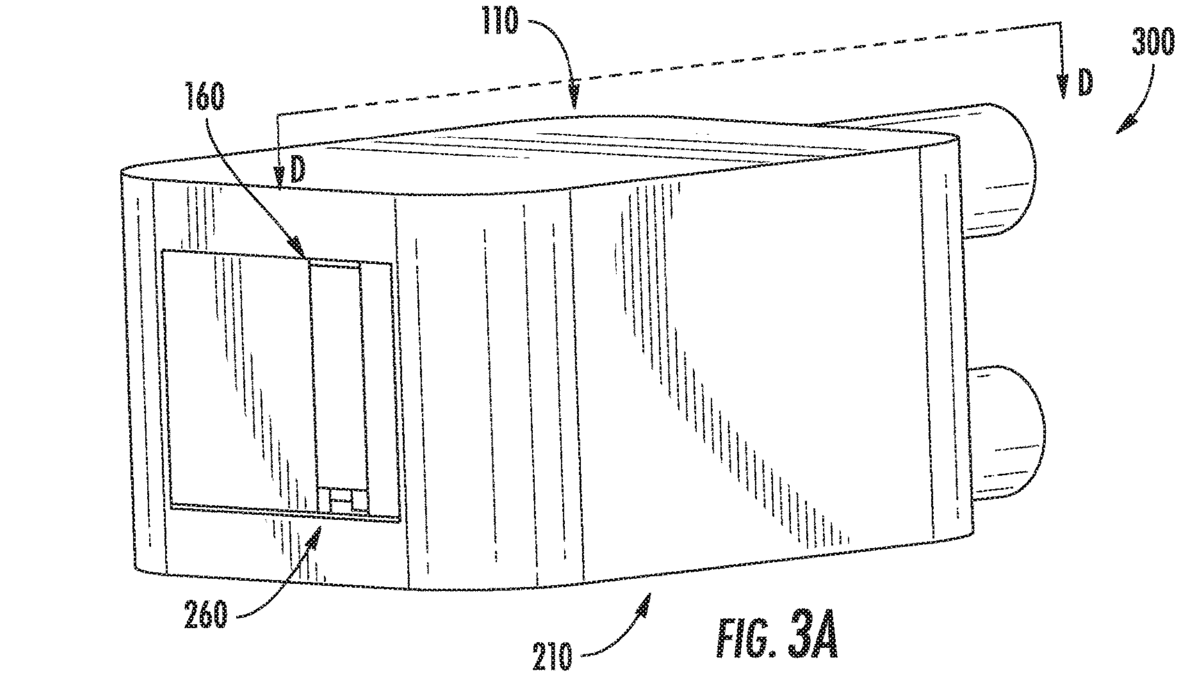
FIG. 3A is a perspective view of a feedback type fluidic oscillator device with atomized output, according to another implementation.
Figure 3B:
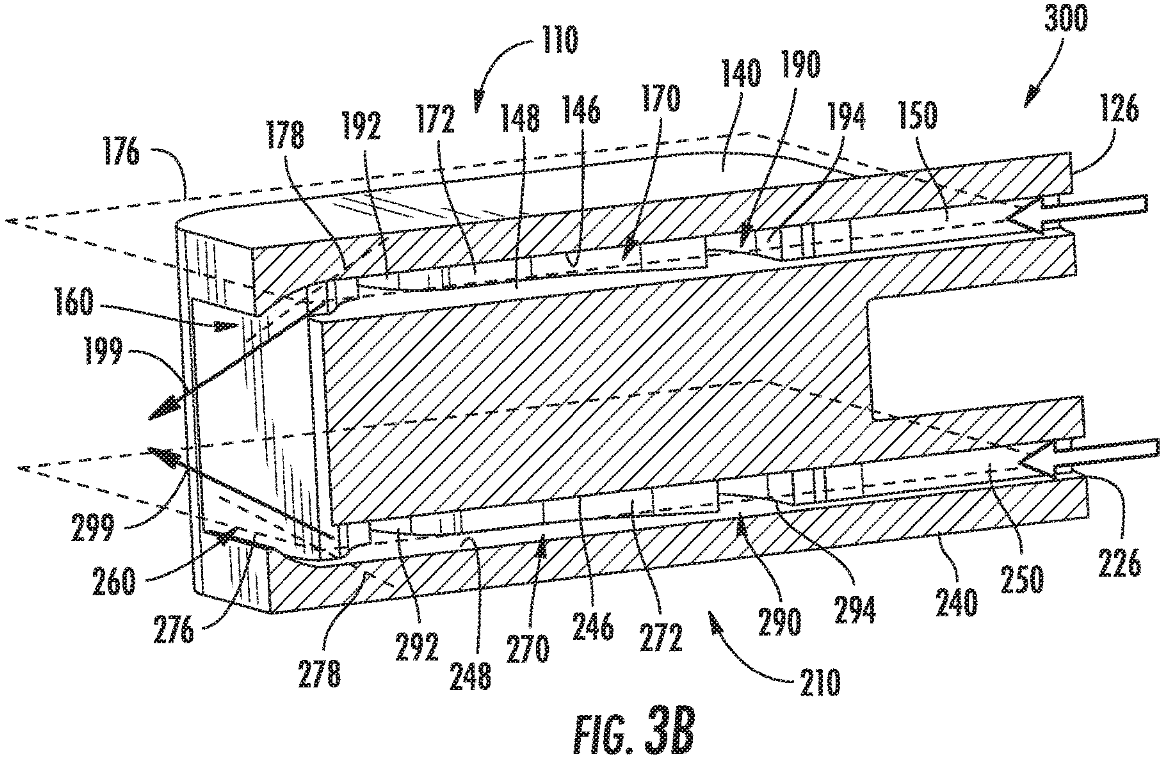
FIG. 3B is a cross-sectional view of the device of FIG. 3A along line D-D.

It should be noted that as the first angle 179 and the second angle 279 increase, the angles at which the respective exiting fluid streams 199, 299 contact the upper and lower surfaces of the outlet nozzles 160, 260 increases, decreasing the performance of the oscillating exiting fluid streams 199, 299. FIGS. 3A and 3B show a feedback type fluidic oscillator device 300 similar to the device 200 shown in FIGS. 2A-2D, but with the portion between the outlet nozzles 160, 260 removed, Because the device 300 does not include the portion between the outlet nozzles 160, 260, the exiting fluid streams 199, 299 contact the outlet nozzles 160, 260 less such the performance of the oscillating exiting fluid streams 199, 299 is not decreased as much.

As discussed above, as the exiting fluid streams 199, 299 collide with each other, the two fluid streams 199, 299 break apart into small droplets, which is called atomizing. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating. Although both of the outlet nozzles 160, 260 of the device 200 shown in FIGS. 2A-2D are angled toward each other, in other implementations, only one of the outlet nozzles of the device is angled toward the other outlet nozzle such that the exiting fluid stream from the angled outlet nozzle collides with the other fluid stream after exiting the other outlet nozzle.

Figure 4A:
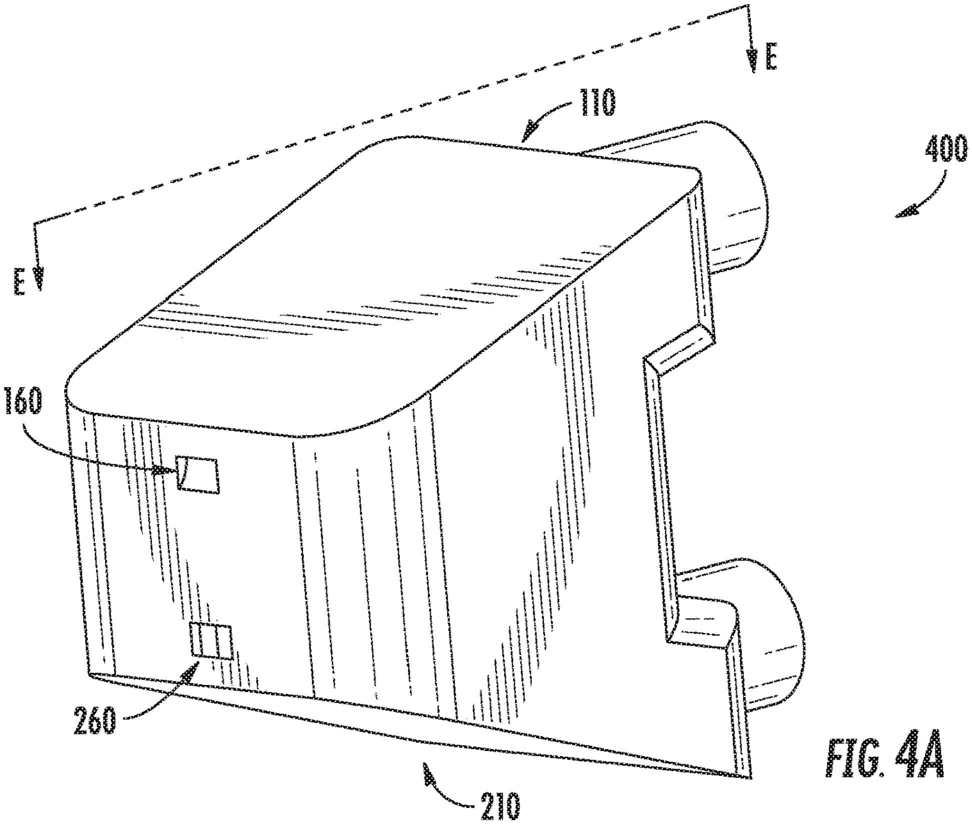
FIG. 4A is a perspective view of a feedback type fluidic oscillator device with atomized output, according to another implementation.
Figure 4B:
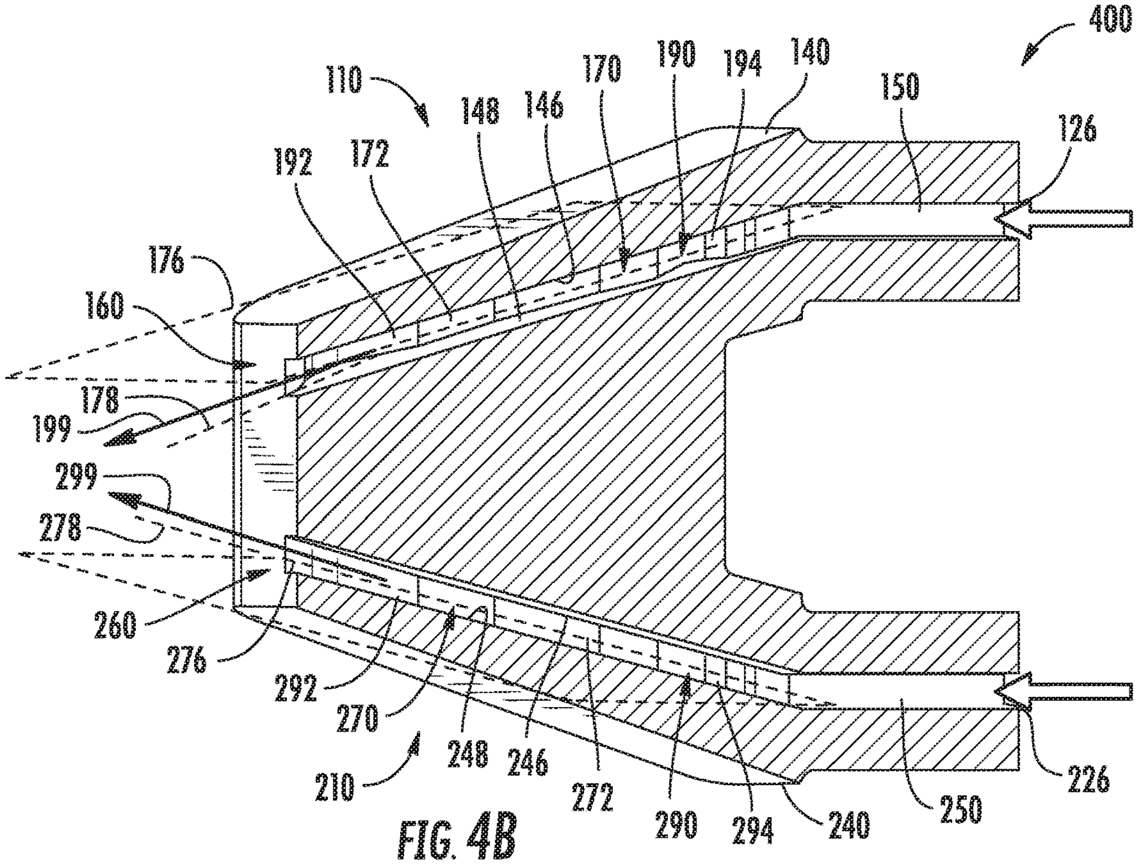
FIG. 4B is a cross-sectional view of the device of FIG. 4A along line E-E.

FIGS. 4A and 4B show a feedback type fluidic oscillator device 400 according to another implementation of the current application. The device 400 includes a first feedback type fluidic oscillator 110 and a second feedback type fluidic oscillator 210. Both the first fluidic oscillator 110 and the second fluidic oscillator 210 are similar to the fluidic oscillators 110, 210 shown in FIGS. 2A-2D, and thus, features of fluidic oscillators 110, 210 are indicated using similar reference numbers. Similar to the device 200 shown in FIGS. 2A-2D, the fluidic oscillators 110, 210 are stacked such that the second surface 148 of the first fluidic oscillator 110 is adjacent the first surface 246 of the second fluidic oscillator 210. However, for the device 400 shown in FIGS. 4A and 4B, the interaction plane 176 of the first fluidic oscillator 110 is not parallel with the interaction chamber plane 276 of the second fluidic oscillator 210. Rather, the interaction chamber plane 176 of the first fluidic oscillator 110 is at an angle to the interaction chamber plane 276 of the second fluidic oscillator 210 such that the distance between the outlet nozzles 160, 260 is shorter than the distance between the fluid supply inlets 150, 250, The angle between the two interaction chamber planes 176, 276 of the device 400 shown in FIGS. 4A and 4B is 60 degrees, but in other implementations, the angle between the two interaction chamber planes is any angle between 0 and 180 degrees.

As with the device 200 of FIGS. 2A-2D, the first feedback channel 190 of the first fluidic oscillator 110 and the first feedback channel 290 of the second fluidic oscillator 210 in the device 400 of FIGS. 4A and 4B share a common intermediate portion 196, 296 such that the adjacent feedback channels 190, 290 are in fluid communication with each other. Furthermore, the second feedback channel 180 of the first fluidic oscillator 110 and the second feedback channel 280 of the second fluidic oscillator 210 share a common intermediate portion 186, 286 such that the adjacent feedback channels 180, 280 are in fluid communication with each other. The shared intermediate portions of 186, 286 the feedback channels 810, 280 cause the fluid streams 199, 299 exiting the outlet nozzles 160, 260 of the first fluidic oscillator 110 and the second fluidic oscillator 210 to oscillate in phase with each other such that the wave form of the exiting fluid streams 199, 299 reach their same respective apices simultaneously.

For the device 400 shown in FIGS. 4A and 4B, the first feedback channels 190, 290 share a common intermediate portion 196, 296 and the second feedback channels 180, 280 share a common intermediate portion 186, 286, but in other implementations, the device only includes common first feedback channels or common second feedback channels. Although the device 400 shown in FIGS. 4A and 4B includes directly shared first intermediate portions 196, 296 and directly shared second intermediate portions 186, 286, in other implementations, the intermediate portions can be distantly shared through tubing or additional channels such that the intermediate portions are in fluid communication with each other. The device 400 shown in FIGS. 4A and 4B includes two fluidic oscillators 110, 210, but in other implementations, the device includes three or more fluidic oscillators.

Because the interaction chamber planes 176, 276 of the fluidic oscillators 110, 210 are at an angle to each other, the outlet nozzles 160, 260 of the first fluidic oscillator 110 and the second fluidic oscillator 210 of the device 400 shown in FIGS. 4A and 4B are also angled toward each other such that the exiting fluid streams 199, 299 collide with each other after exiting the outlet nozzles 160, 260. As the exiting fluid streams 199, 299 collide with each other, the two fluid streams 199, 299 break apart into small droplets and are atomized. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating.

Figure 5A:
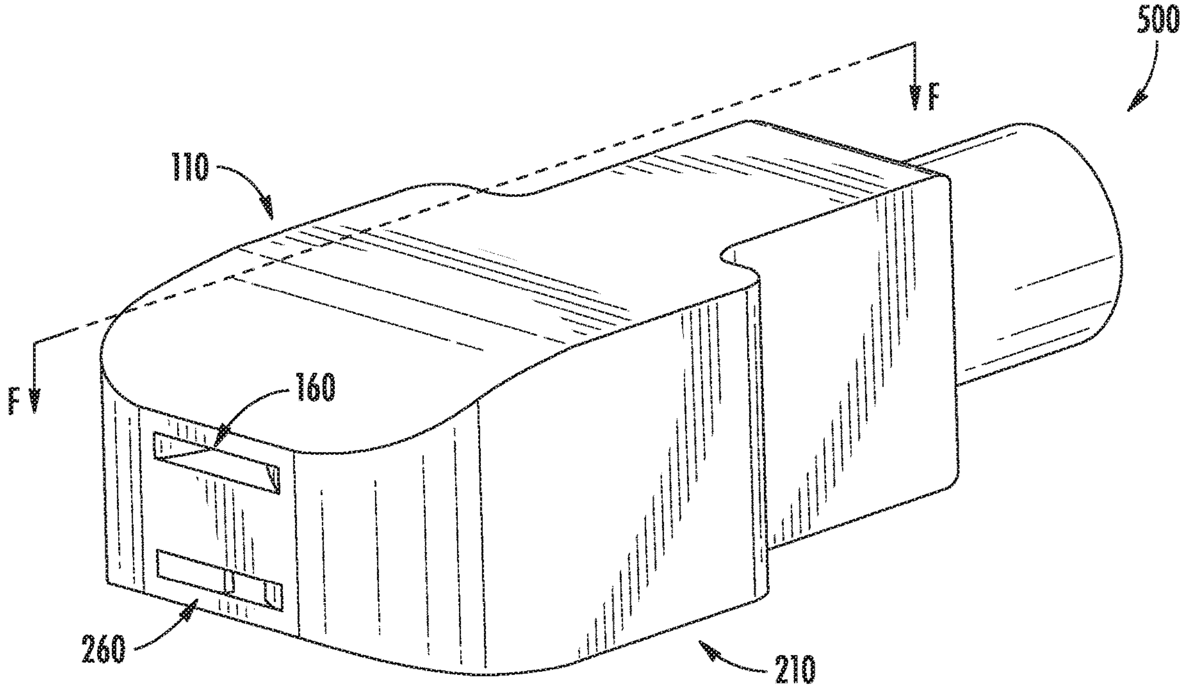
FIG. 5A is a perspective view of a feedback type fluidic oscillator device with atomized output, according to another implementation.
Figure 5B:
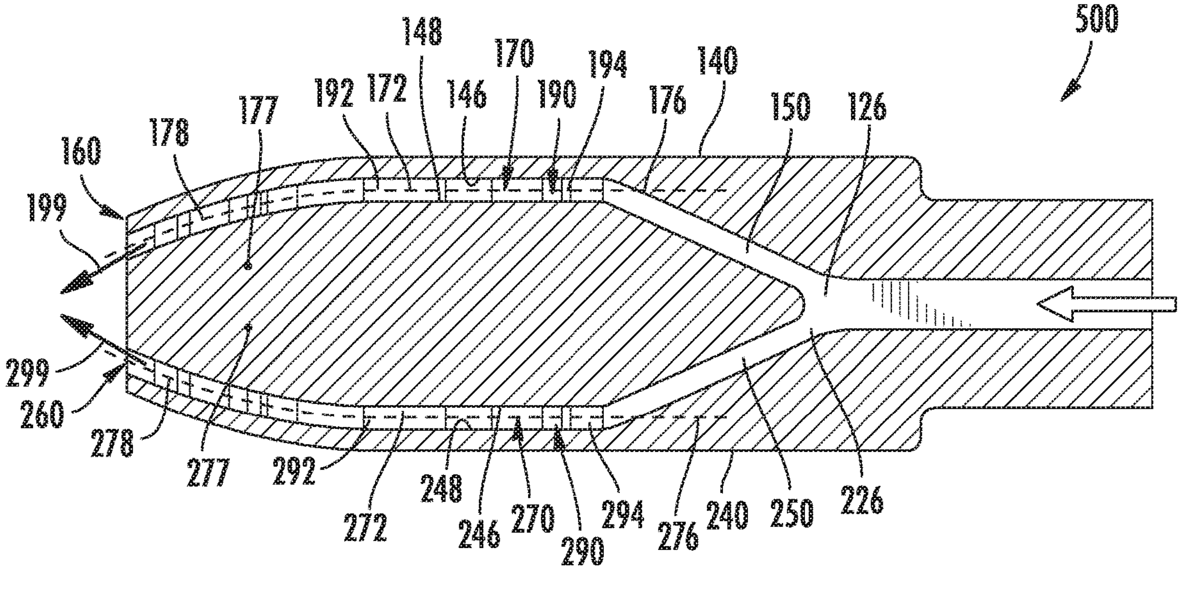
FIG. 5B is a cross-sectional view of the device of FIG. 5A along line F-F.

FIGS. 5A and 5B show a feedback type fluidic oscillator device 500 according to another implementation of the current application. The device 500 includes a first feedback type fluidic oscillator 110 and a second feedback type fluidic oscillator 210. Both the first fluidic oscillator 110 and the second fluidic oscillator 210 are similar to the fluidic oscillators 110, 210 shown in FIGS. 2A-2D, and thus, features of fluidic oscillators 110, 210 are indicated using similar reference numbers. Similar to the device 200 shown in FIGS. 2A-2D, the fluidic oscillators 110, 210 are stacked such that the second surface 148 of the first fluidic oscillator 110 is adjacent the first surface 246 of the second fluidic oscillator 210. The interaction plane 176 of the first fluidic oscillator 110 is parallel with the interaction chamber plane 276 of the second fluidic oscillator 210. As with the device 200 of FIGS. 2A-2D, the first feedback channel 190 of the first fluidic oscillator 110 and the first feedback channel 290 of the second fluidic oscillator 210 in the device 500 of FIGS. 5A and 5B share a common intermediate portion 196, 296 such that the adjacent feedback channels 190, 290 are in fluid communication with each other. Furthermore, the second feedback channel 180 of the first fluidic oscillator 110 and the second feedback channel 280 of the second fluidic oscillator 210 share a common intermediate portion 186, 286 such that the adjacent feedback channels 180, 280 are in fluid communication with each other. The shared intermediate portions of 186, 286 the feedback channels 110, 280 cause the fluid streams 199, 299 exiting the outlet nozzles 160, 260 of the first fluidic oscillator 110 and the second fluidic oscillator 210 to oscillate in phase with each other such that the wave form of the exiting fluid streams 199, 299 reach their same respective apices simultaneously.

The interaction planes 176, 276 of the device 500 shown in FIGS. 5A and 5B are parallel to each other, but in other implementations, the interaction chamber planes are at any angle relative to each other. For the device 500 shown in FIGS. 5A and 5B, the first feedback channels 190, 290 share a common intermediate portion 196, 296 and the second feedback channels 180, 280 share a common intermediate portion 186, 286, but in other implementations, the device only includes common first feedback channels or common second feedback channels. Although the device 500 shown in FIGS. 5A and 5B includes directly shared first intermediate portions 196, 296 and directly shared second intermediate portions 186, 286, in other implementations, the intermediate portions can be distantly shared through tubing or additional channels such that the intermediate portions are in fluid communication with each other. The device 500 shown in FIGS. 5A and 5B includes two fluidic oscillators 110, 210, but in other implementations, the device includes three or more fluidic oscillators.

To create an atomized output, the outlet nozzle 160 of the first fluidic oscillator 110 and the outlet nozzle 260 of the second fluidic oscillator 210 are structured such that the fluid streams 199, 299 exiting the outlet nozzle 160 of the first fluidic oscillator 110 and the outlet nozzle 260 of the second fluidic oscillator 210 collide with each other. The outlet nozzles 160, 260 of the first fluidic oscillator 110 and the second fluidic oscillator 210 of the device 500 shown in FIGS. 5A and 5B each include an axis of rotation 177, 277, and the central axis 178, 278 of the outlet nozzle 160, 260 of each of the first and second fluidic oscillators 110, 210 extends circumferentially around the axis of rotation 177, 277 of the respective outlet nozzle 160, 260. In FIGS. 5A and 5B, the entire central axis 178, 278 of each outlet nozzle 160, 260 extends around its respective axis of rotation 177, 277, but in other implementations, only a portion of each of the central axes extend around their respective axes of rotations, and the portions of each can be different than the other. Although both of the central axes 178, 278 of the outlet nozzles 160, 260 of the device 500 shown in FIGS. 5A and 5B extend around axes of rotation 177, 277, in other implementations, only one of the central axes extends around its respective axis of rotation. It should be noted that as the portions of central axes that extend around their respective axes of rotations increase and as the radius of the curvature of the central axes decreases, the angles at which the respective exiting fluid streams 199, 299 contact the upper and lower surfaces of the outlet nozzles 160, 260 increases, decreasing the performance of the oscillating exiting fluid streams 199, 299.

Thus, the outlet nozzles 160, 260 of the fluidic oscillators 110, 210 are structured such that the exiting fluid streams 199, 299 collide with each other after exiting the outlet nozzles 160, 260. As the exiting fluid streams 199, 299 collide with each other, the two fluid streams 199, 299 break apart into small droplets and are atomized. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating.

Figure 6A:
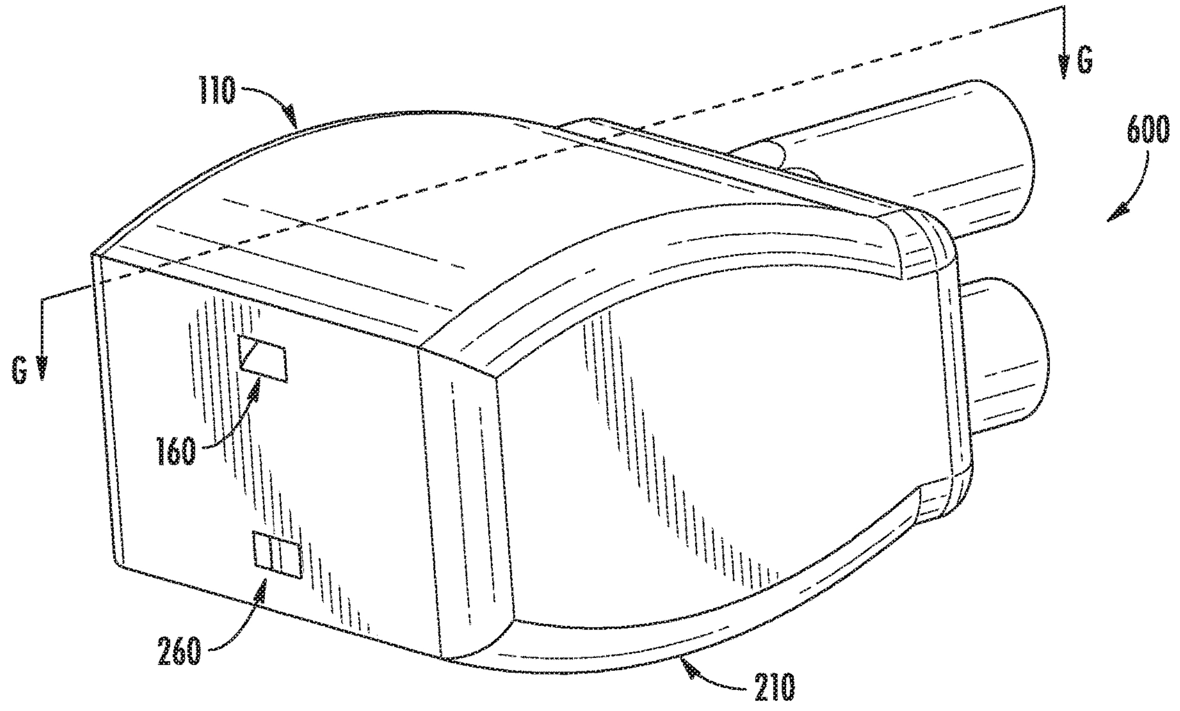
FIG. 6A is a perspective view of a feedback type fluidic oscillator device with atomized output, according to another implementation.
Figure 6B:
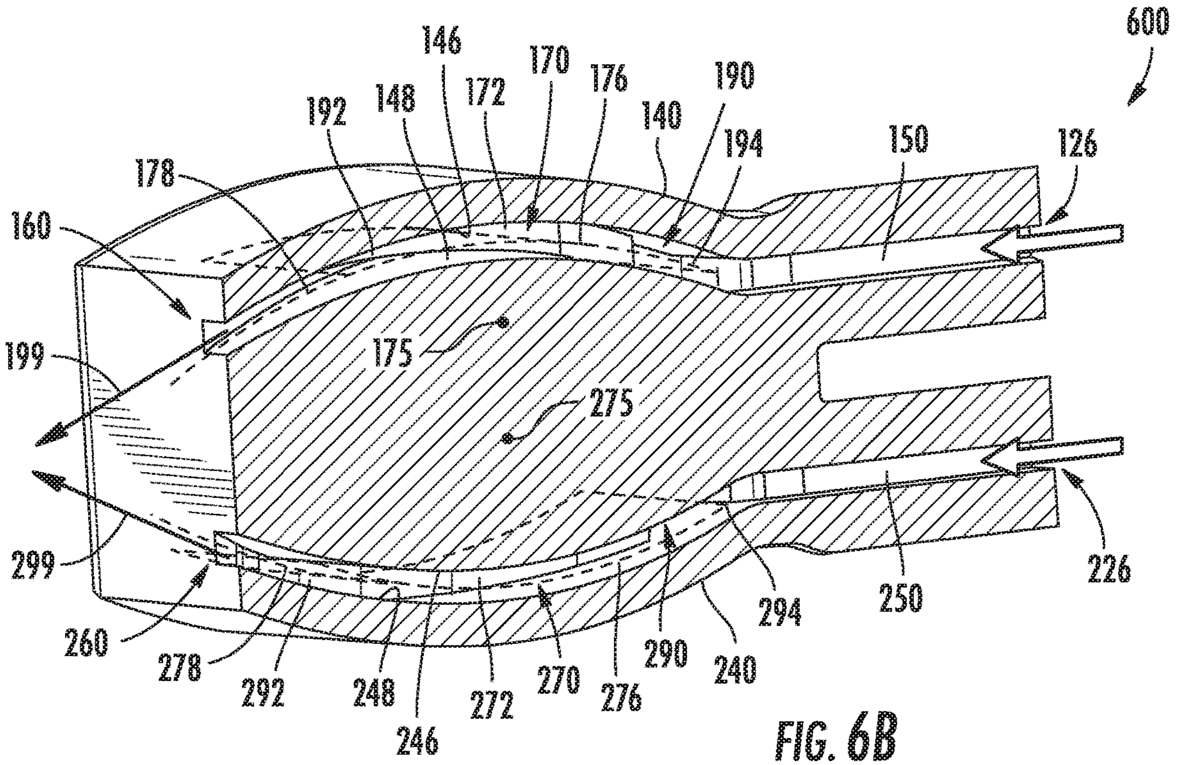
FIG. 6B is a cross-sectional view of the device of FIG. 6A along line G-G.

FIGS. 6A and 6B shows a feedback type fluidic oscillator device 600 according to another implementation of the current application. The device 600 includes a first feedback type fluidic oscillator 110 and a second feedback type fluidic oscillator 210. Both the first fluidic oscillator 110 and the second fluidic oscillator 210 are similar to the fluidic oscillators 110, 210 shown in FIGS. 2A-2D, and thus, features of fluidic oscillators 110, 210 are indicated using similar reference numbers. Similar to the device 200 shown in FIGS. 2A-2D, the fluidic oscillators 110, 210 are stacked such that the second surface 148 of the first fluidic oscillator 110 is adjacent the first surface 246 of the second fluidic oscillator 210. As with the device 200 of FIGS. 2A-2D, the first feedback channel 190 of the first fluidic oscillator 110 and the first feedback channel 290 of the second fluidic oscillator 210 in the device 600 of FIGS. 6A and 6B share a common intermediate portion 196, 296 such that the adjacent feedback channels 190, 290 are in fluid communication with each other. Furthermore, the second feedback channel 180 of the first fluidic oscillator 110 and the second feedback channel 280 of the second fluidic oscillator 210 share a common intermediate portion 186, 286 such that the adjacent feedback channels 180, 280 are in fluid communication with each other. The shared intermediate portions of 186, 286 the feedback channels 110, 280 cause the fluid streams 199, 299 exiting the outlet nozzles 160, 260 of the first fluidic oscillator 110 and the second fluidic oscillator 210 to oscillate in phase with each other such that the wave form of the exiting fluid streams 199, 299 reach their same respective apices simultaneously.

For the device 600 shown in FIGS. 6A and 6B, the first feedback channels 190, 290 share a common intermediate portion 196, 296 and the second feedback channels 180, 280 share a common intermediate portion 186, 286, but in other implementations, the device only includes common first feedback channels or common second feedback channels. Although the device 600 shown in FIGS. 6A and 6B includes directly shared first intermediate portions 196, 296 and directly shared second intermediate portions 186, 286, in other implementations, the intermediate portions can be distantly shared through tubing or additional channels such that the intermediate portions are in fluid communication with each other. The device 600 shown in FIGS. 6A and 6B includes two fluidic oscillators 110, 210, but in other implementations, the device includes three or more fluidic oscillators.

To create an atomized output, the outlet nozzle 160 of the first fluidic oscillator 110 and the outlet nozzle 260 of the second fluidic oscillator 210 are structured such that the fluid streams 199, 299 exiting the outlet nozzle 160 of the first fluidic oscillator 110 and the outlet nozzle 260 of the second fluidic oscillator 210 collide with each other. The first fluidic oscillator 110 and the second fluidic oscillator 210 of the device 600 shown in FIGS. 6A and 6B each include an axis of rotation 175, 275, and the interaction chamber plane 176, 276 of each of the first and second fluidic oscillators 110, 210 extends circumferentially around the respective axis of rotation 175, 275. In FIGS. 6A and 6B, the entirety of each interaction chamber plane 176, 276 extends around its respective axis of rotation 175, 275, but in other implementations, only a portion of each interaction chamber plane 176, 276 extends around its respective axis of rotation 175, 275, and the portions of each can be different than the other. Although both of the interaction chamber planes 176, 276 of the device 600 shown in FIGS. 6A and 6B extend around axes of rotations 175, 275, in other implementations, only one of the interaction chambers extends around its respective axis of rotation. It should be noted that as the portions of the interaction chamber planes 176, 276 that extend around their respective axes of rotations 175, 275 increase and as the radius of the curvature of the interaction chamber planes 176, 276 decreases, the angles at which the respective exiting fluid streams 199, 299 contact the first and second surfaces 146, 246, 148, 248 of the interaction chamber 170, 270 increases, decreasing the performance of the oscillating exiting fluid streams 199, 299.

Because of the curvature of the interaction chamber planes 176, 276 in FIGS. 6A and 6B, the outlet nozzles 160, 260 of the fluidic oscillators 110, 210 are structured such that the exiting fluid streams 199, 299 collide with each other after exiting the outlet nozzles 160, 260. As the exiting fluid streams 199, 299 collide with each other, the two fluid streams 199, 299 break apart into small droplets and are atomized. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating.

Figure 7A:
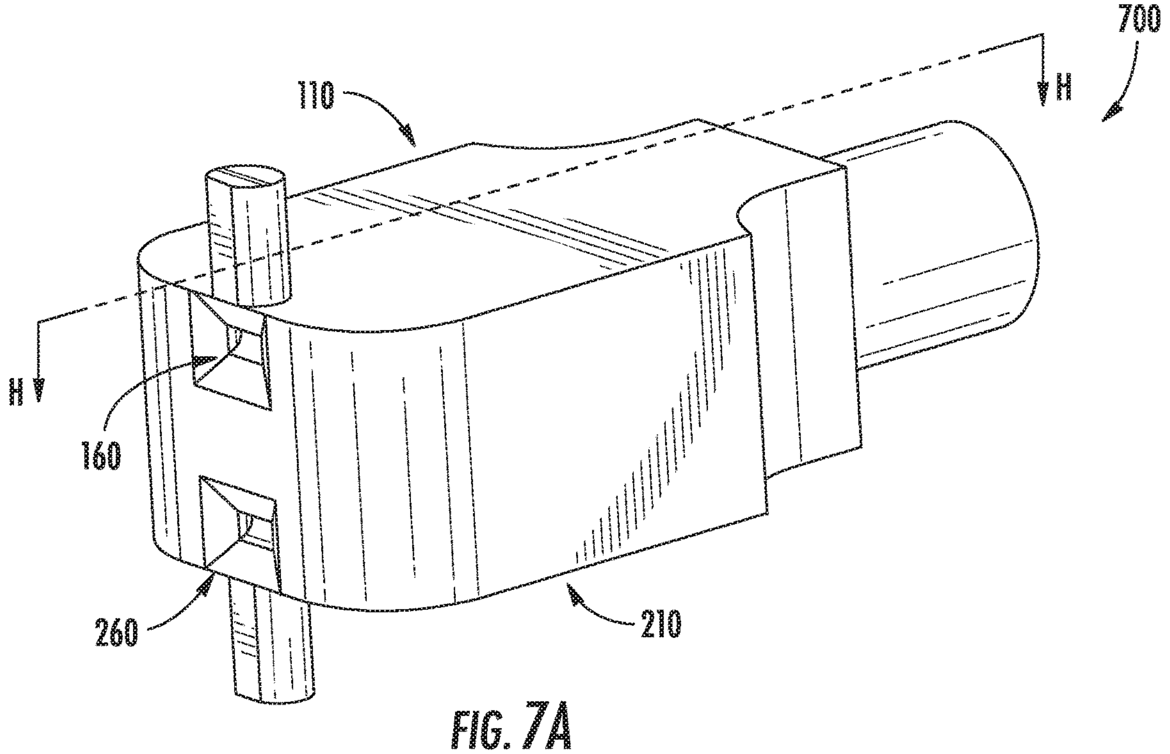
FIG. 7A is a perspective view of a feedback type fluidic oscillator device with atomized output, according to another implementation.
Figure 7B:
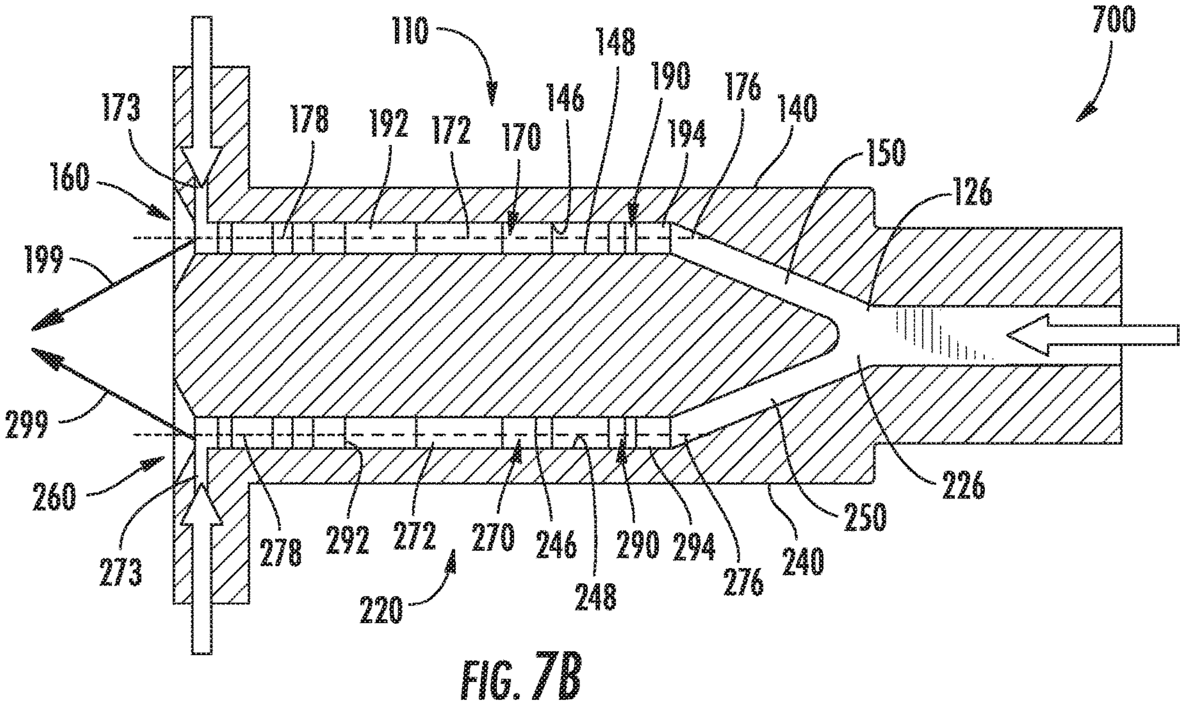
FIG. 7B is a cross-sectional view of the device of FIG. 7A along line H-H.

FIGS. 7A and 7B shows a feedback type fluidic oscillator device 700 according to another implementation of the current application. The device 700 includes a first feedback type fluidic oscillator 110 and a second feedback type fluidic oscillator 210. Both the first fluidic oscillator 110 and the second fluidic oscillator 210 are similar to the fluidic oscillators 110, 210 shown in FIGS. and thus, features of fluidic oscillators 110, 210 are indicated using similar reference numbers. Similar to the device 200 shown in FIGS. 2A-2D, the fluidic oscillators 110, 210 are stacked such that the second surface 148 of the first fluidic oscillator 110 is adjacent the first surface 246 of the second fluidic oscillator 210. The interaction plane 176 of the first fluidic oscillator 110 is parallel with the interaction chamber plane 276 of the second fluidic oscillator 210. As with the device 200 of FIGS. 2A-2D, the first feedback channel 190 of the first fluidic oscillator 110 and the first feedback channel 290 of the second fluidic oscillator 210 in the device 700 of FIGS. 7A and 7B share a common intermediate portion 196, 296 such that the adjacent feedback channels 190, 290 are in fluid communication with each other. Furthermore, the second feedback channel 180 of the first fluidic oscillator 110 and the second feedback channel 280 of the second fluidic oscillator 210 share a common intermediate portion 186, 286 such that the adjacent feedback channels 180, 280 are in fluid communication with each other. The shared intermediate portions of 186, 286 the feedback channels 110, 280 cause the fluid streams 199, 299 exiting the outlet nozzles 160, 260 of the first fluidic oscillator 110 and the second fluidic oscillator 210 to oscillate in phase with each other such that the wave form of the exiting fluid streams 199, 299 reach their same respective apices simultaneously.

The interaction planes 176, 276 of the device 700 shown in FIGS. 7A and 7B are parallel to each other, but in other implementations, the interaction chamber planes are at any angle relative to each other. For the device 700 shown in FIGS. 7A and 7B, the first feedback channels 190, 290 share a common intermediate portion 196, 296 and the second feedback channels 180, 280 share a common intermediate portion 186, 286, but in other implementations, the device only includes common first feedback channels or common second feedback channels. Although the device 700 shown in FIGS. 7A and 7B includes directly, shared first intermediate portions 196, 296 and directly shared second intermediate portions 186, 286, in other implementations, the intermediate portions can be distantly shared through tubing or additional channels such that the intermediate portions are in fluid communication with each other. The device 700 shown in FIGS. 7A and 7B includes two fluidic oscillators 110, 210, but in other implementations, the device includes three or more fluidic oscillators.

To create an atomized output, the outlet nozzle 160 of the first fluidic oscillator 110 and the outlet nozzle 260 of the second fluidic oscillator 210 are structured such that the fluid streams 199, 299 exiting the outlet nozzle 160 of the first fluidic oscillator 110 and the outlet nozzle 260 of the second fluidic oscillator 210 collide with each other. The central axes 178, 278 of the outlet nozzles 160, 260 of the first fluidic oscillator 110 and the second fluidic oscillator 210 of the device 700 shown in FIGS. 7A and 7B are parallel with their respective interaction chamber planes 176, 276, but the outlet nozzle 160, 260 each fluidic oscillator 110, 210 includes a control port 173, 273 for introducing fluid into the outlet nozzle 160, 260 of the fluidic oscillators 110, 210 to redirect the fluid stream 199, 299 exiting the outlet nozzle 160, 260. In FIGS. 7A and 7B, the control ports 173, 273 introduce fluid into their respective outlet nozzles 160, 260, but in other implementations, the control ports 173, 273 suction fluid from the outlet nozzles of the fluidic oscillators to redirect the fluid streams exiting the outlet nozzles. The introduction of fluid into, or suctioning of fluid from, the outlet nozzles can be continuous or intermittent, and the rates of introduction and suctioning of fluid can vary. Although both of the outlet nozzles 160, 260 of the device 700 shown in FIGS. 7A and 7B include control ports 173, 273, in other implementations, only one of the outlet nozzles includes a control port. It should be noted that as rates at which fluid is introduced or suctioned from the outlet nozzles increase, the more resistance the respective exiting fluid streams 199, 299 is introduced, decreasing the performance of the oscillating exiting fluid streams 199, 299.

Thus, the outlet nozzles 160, 260 of the fluidic oscillators 110, 210 are structured such that the exiting fluid streams 199, 299 collide with each other after exiting the outlet nozzles 160, 260. As the exiting fluid streams 199, 299 collide with each other, the two fluid streams 199, 299 break apart into small droplets and are atomized. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating.

Figure 8A:
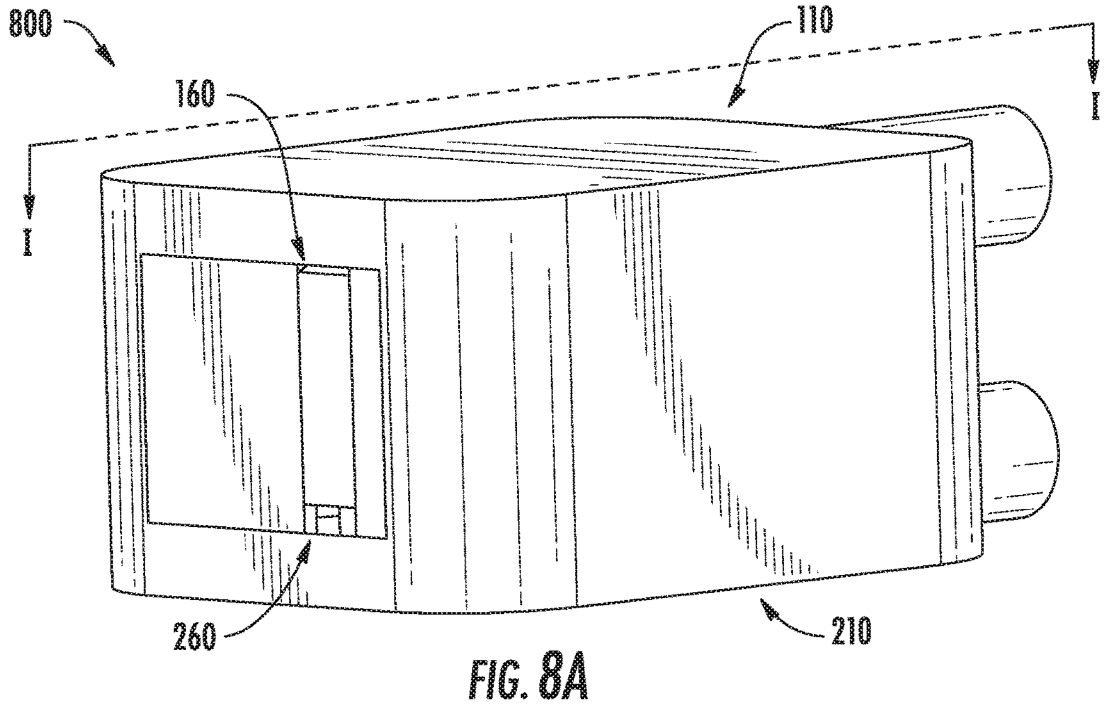
FIG. 8A is a perspective view of a feedback type fluidic oscillator device with atomized output, according to another implementation.
Figure 8B:
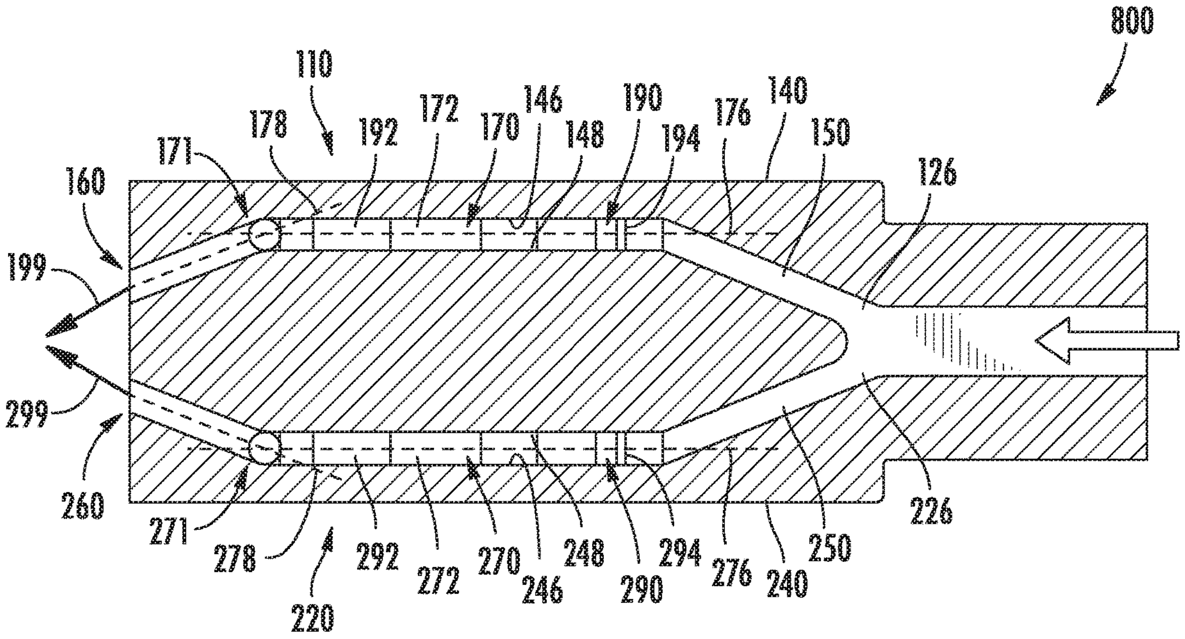
FIG. 8B is a cross-sectional view of the device of FIG. 8A along line I-I.

FIGS. 8A and 8B shows a feedback type fluidic oscillator device 800 according to another implementation of the current application. The device 800 includes a first feedback type fluidic oscillator 110 and a second feedback type fluidic oscillator 210. Both the first fluidic oscillator 110 and the second fluidic oscillator 210 are similar to the fluidic oscillators 110, 210 shown in FIGS. and thus, features of fluidic oscillators 110, 210 are indicated using similar reference numbers. Similar to the device 200 shown in FIGS. 2A-2D, the fluidic oscillators 110, 210 are stacked such that the second surface 148 of the first fluidic oscillator 110 is adjacent the first surface 246 of the second fluidic oscillator 210. The interaction plane 176 of the first fluidic oscillator 110 is parallel with the interaction chamber plane 276 of the second fluidic oscillator 210. As with the device 200 of FIGS. 2A-2D, the first feedback channel 190 of the first fluidic oscillator 110 and the first feedback channel 290 of the second fluidic oscillator 210 in the device 800 of FIGS. 8A and 8B share a common intermediate portion 196, 296 such that the adjacent feedback channels 190, 290 are in fluid communication with each other. Furthermore, the second feedback channel 180 of the first fluidic oscillator 110 and the second feedback channel 280 of the second fluidic oscillator 210 share a common intermediate portion 186, 286 such that the adjacent feedback channels 180, 280 are in fluid communication with each other. The shared intermediate portions of 186, 286 the feedback channels 110, 280 cause the fluid streams 199, 299 exiting the outlet nozzles 160, 260 of the first fluidic oscillator 110 and the second fluidic oscillator 210 to oscillate in phase with each other such that the wave form of the exiting fluid streams 199, 299 reach their same respective apices simultaneously.

The interaction planes 176, 276 of the device 800 shown in FIGS. 8A and 8B are parallel to each other, but in other implementations, the interaction chamber planes are at any angle relative to each other. For the device 800 shown in FIGS. 8A and 8B, the first feedback channels 190, 290 share a common intermediate portion 196, 296 and the second feedback channels 180, 280 share a common intermediate portion 186, 286, but in other implementations, the device only includes common first feedback channels or common second feedback channels. Although the device 800 shown in FIGS. 8A and 8B includes directly, shared first intermediate portions 196, 296 and directly shared second intermediate portions 186, 286, in other implementations, the intermediate portions can be distantly shared through tubing or additional channels such that the intermediate portions are in fluid communication with each other. The device 800 shown in FIGS. 8A and 8B includes two fluidic oscillators 110, 210, but in other implementations, the device includes three or more fluidic oscillators.

To create an atomized output, the outlet nozzle 160 of the first fluidic oscillator 110 and the outlet nozzle 260 of the second fluidic oscillator 210 are structured such that the fluid streams 199, 299 exiting the outlet nozzle 160 of the first fluidic oscillator 110 and the outlet nozzle 260 of the second fluidic oscillator 210 collide with each other. Each of the outlet nozzles 160, 260 includes a hinging portion 171, 271 for changing an angle 179, 279 of the fluid stream 199, 299 exiting the respective outlet nozzle 160, 260 relative to the fluid stream 199, 299 exiting the other outlet nozzle 160, 260. The hinging portions 171, 271 allow the angle 179, 279 of the outlet nozzles 160, 260 to be varied between 0 and 90 degrees and can be different angles than each other. It should be noted that as the angles 179, 279 increase, the angles at which the respective exiting fluid streams 199, 299 contact the upper and lower surfaces of the outlet nozzles 160, 260 increases, decreasing the performance of the oscillating exiting fluid streams 199, 299. In some implementations, the device includes two or more separate fluidic oscillators hingedly coupled to each other by a hinging portion. The relative angle between the two or more oscillators is adjustable along the hinging portion such that the exiting fluid streams collide with each other. Thus, this implementation allows the interaction chamber planes of the two or more fluidic oscillators to be disposed at an angle to each other similar to the device 400 shown in FIGS. 4A and 4B.

Thus, the outlet nozzles 160, 260 of the fluidic oscillators 110, 210 are structured such that the exiting fluid streams 199, 299 collide with each other after exiting the outlet nozzles 160, 260. As the exiting fluid streams 199, 299 collide with each other, the two fluid streams 199, 299 break apart into small droplets and are atomized. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating.

Figure 9A:
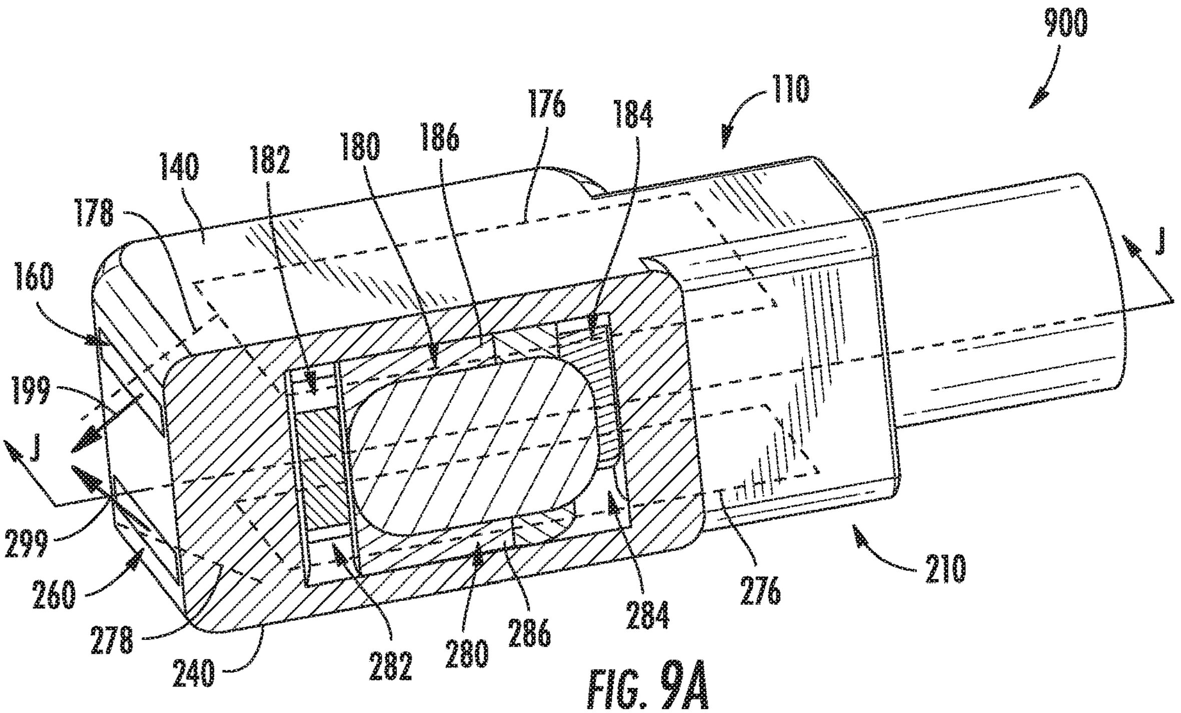
FIG. 9A is a perspective view of a feedback type fluidic oscillator device with atomized output, according to another implementation.
Figure 9B:
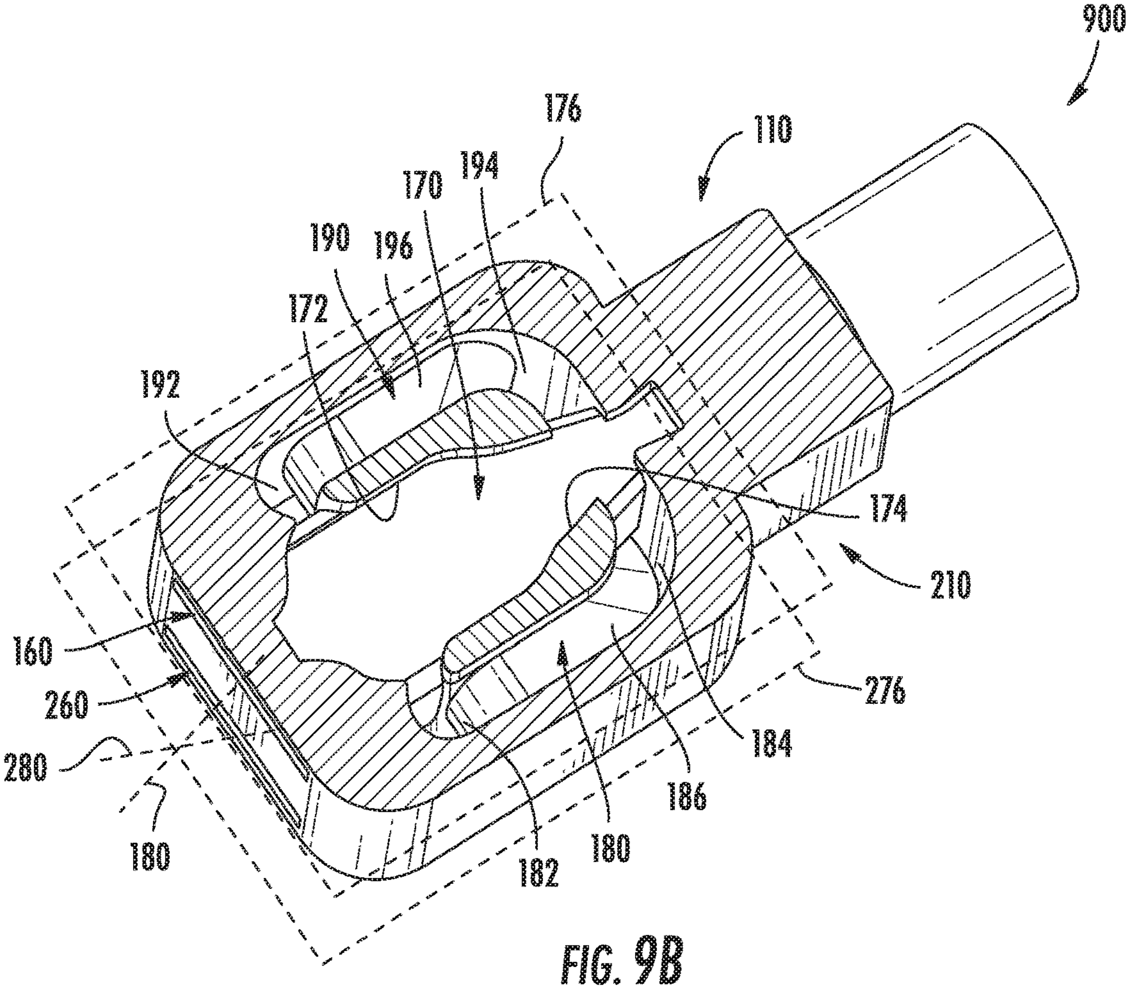
FIG. 9B is a cross-sectional view of the device of FIG. 9A along line J-J.

FIGS. 9A and 9B show a feedback type fluidic oscillator device 900 according to another implementation of the current application. The device 900 includes a first feedback type fluidic oscillator 110 and a second feedback type fluidic oscillator 210. Both the first fluidic oscillator 110 and the second fluidic oscillator 210 are similar to the fluidic oscillators 110, 210 shown in FIGS. 2A-2D, and thus, features of fluidic oscillators 110, 210 are indicated using similar reference numbers. Similar to the device 200 shown in FIGS. 2A-2D, the fluidic oscillators 110, 210 are stacked such that the second surface 148 of the first fluidic oscillator 110 is adjacent the first surface 246 of the second fluidic oscillator 210. The interaction plane 176 of the first fluidic oscillator 110 is parallel with the interaction chamber plane 276 of the second fluidic oscillator 210. However, unlike the device 200 of FIGS. 2A-2D, the first feedback channel 190 of the first fluidic oscillator 110 and the first feedback channel 290 of the second fluidic oscillator 210 in the device 900 of FIGS. 9A and 9B share a common first end 192, 292 and a common second end 194, 294 such that the first feedback channels 190, 290 are in fluid communication with each other. Furthermore, the second feedback channel 180 of the first fluidic oscillator 110 and the second feedback channel 280 of the second fluidic oscillator 210 share a common first end 182, 282 and a common second end 184, 284 such that the second feedback channels 180, 280 are in fluid communication with each other. The shared first end 192, 292, 182, 282 and second ends 194, 294, 184, 284 of the feedback channels 190, 290, 180, 280 cause the fluid streams 199, 299 exiting the outlet nozzles 160, 260 of the first fluidic oscillator 110 and the second fluidic oscillator 210 to oscillate in phase with each other such that the wave form of the exiting fluid streams 199, 299 reach their same respective apices simultaneously.

The interaction planes 176, 276 of the device 900 shown in FIGS. 9A and 9B are parallel to each other, but in other implementations, the interaction chamber planes are at any angle relative to each other. For the device 900 shown in FIGS. 9A and 9B, the first feedback channels 190, 290 share common first ends 192, 292 and second ends 194, 294 and the second feedback channels 180, 280 share common first ends 182, 282 and second ends 184, 284, but in other implementations, the device only includes common first feedback channels or common second feedback channels. Although the device 900 shown in FIGS. 9A and 9B includes directly shared first ends 192, 292 and second ends 194, 294 of the first feedback channels 190, 290 and directly shared first ends 182, 282 and second ends 184, 284 of the second feedback channels 180, 280, in other implementations, the intermediate portions can be distantly shared through tubing or additional channels such that the intermediate portions are in fluid communication with each other. The device 900 shown in FIGS. 9A and 9B includes two fluidic oscillators 110, 210, but in other implementations, the device includes three or more fluidic oscillators.

To create an atomized output, the outlet nozzle 160 of the first fluidic oscillator 110 and the outlet nozzle 260 of the second fluidic oscillator 210 are structured such that the fluid streams 199, 299 exiting the outlet nozzle 160 of the first fluidic oscillator 110 and the outlet nozzle 260 of the second fluidic oscillator 210 collide with each other. As with the device 200 shown in FIGS. 2A-2D, the outlet nozzles 160, 260 of the first fluidic oscillator 110 and the second fluidic oscillator 210 of the device 900 shown in FIGS. 9A and 9B are angled toward each other such that the exiting fluid streams 199, 299 collide with each other after exiting the outlet nozzles 160, 260. The central axis 178 of the outlet nozzle 160 of the first fluidic oscillator 110 is disposed at a first angle 179 to the interaction chamber plane 176 of the first fluidic oscillator 110. In FIGS. 9A and 9B, the first angle 179 is 30 degrees and the second angle 279 is 30 degrees, but in other implementations, the first angle and the second angle are any other angle between 0 and 90 degrees and can be different angles than each other. It should be noted that as the first angle 179 and the second angle 279 increase, the angles at which the respective exiting fluid streams 199, 299 contact the upper and lower surfaces of the outlet nozzles 160, 260 increases, decreasing the performance of the oscillating exiting fluid streams 199, 299. In other implementations, the device includes shared first and second ends of the feedback channels to create in-phase oscillations for the output fluid streams, as in the device 900 shown in FIGS. 9A and 9B, but include one of the features from the devices shown in FIGS. 3-8 for creating an atomized output by causing the output fluid streams to collide with each other.

Thus, the outlet nozzles 160, 260 of the fluidic oscillators 110, 210 are structured such that the exiting fluid streams 199, 299 collide with each other after exiting the outlet nozzles 160, 260. As the exiting fluid streams 199, 299 collide with each other, the two fluid streams 199, 299 break apart into small droplets and are atomized. Because the two exiting fluid streams 199, 299 oscillate in phase with each other, the fluid streams 199, 299 are constantly colliding with each other as they oscillate, causing the point of collision to move from side to side. Thus, the atomization of the fluid streams 199, 299 is produced at a wider angle and results in a more even coverage than if the colliding fluid streams were not oscillating.

Many of the features of the devices shown in FIGS. 2-9 and described above for directing output fluid streams of in-phase feedback type fluidic oscillators can also be used in devices including two or more in-phase jet interaction-type fluidic oscillators. But before discussing how two or more jet interaction-type fluidic oscillators can be controlled to produce in-phase oscillations, it is helpful to understand how a single jet interaction-type fluidic oscillator produces an oscillating output fluid stream.

Figure 10A:
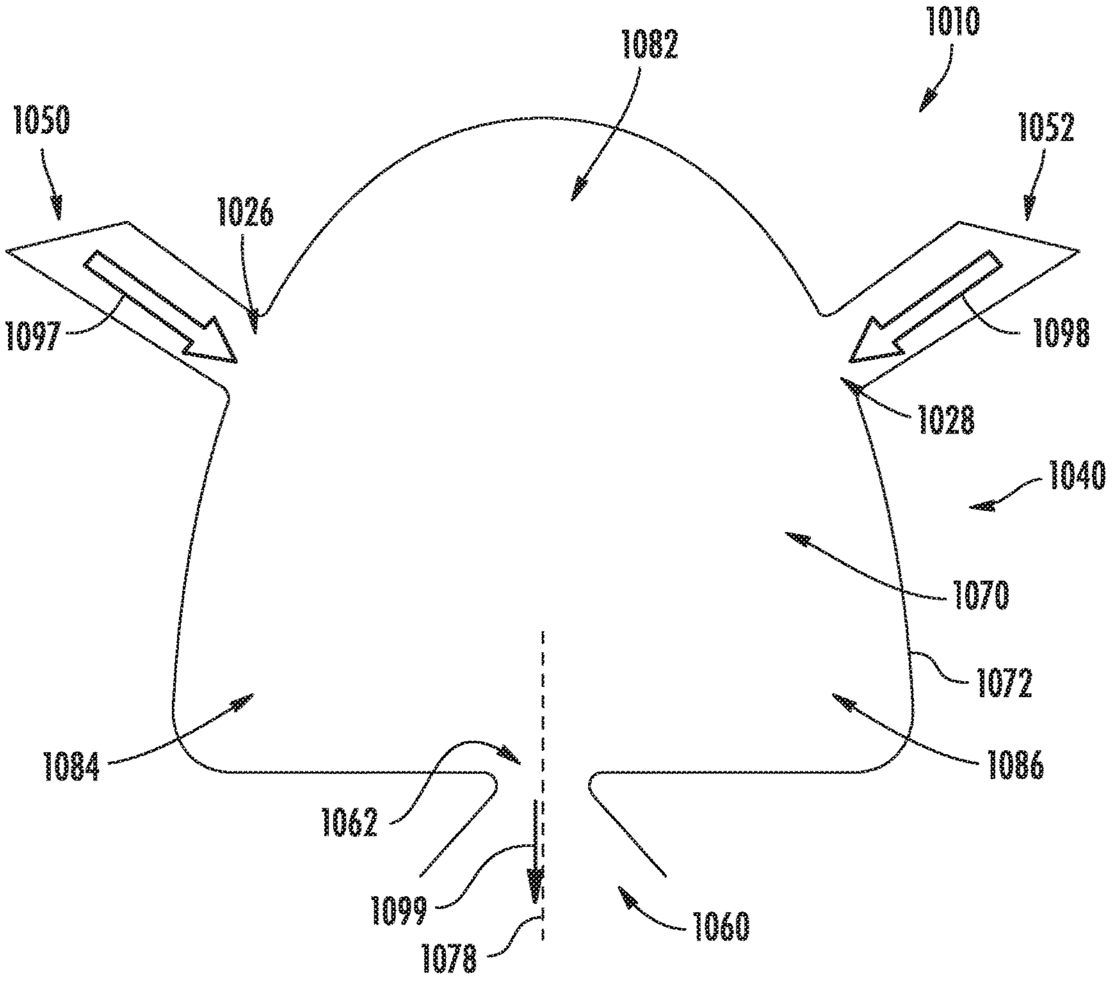
FIG. 10A (PRIOR ART)
FIG. 10A is a top view of a single jet interaction-type fluidic oscillator of the prior att.
Figure 10B:
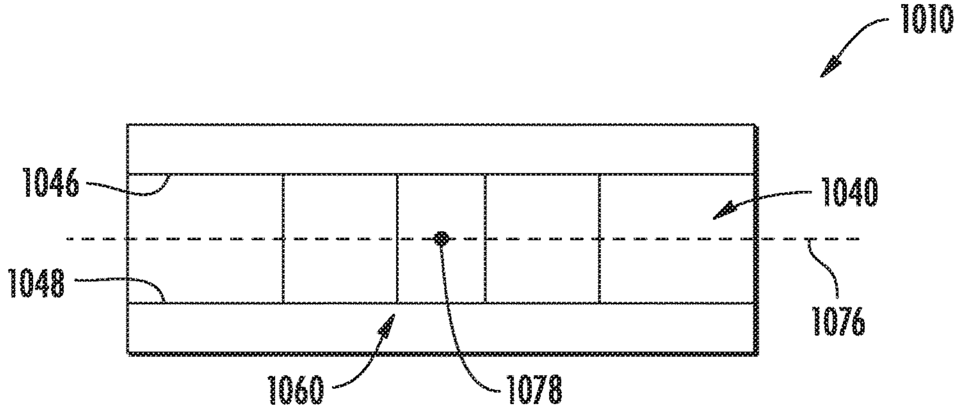
FIG. 10B (PRIOR ART)
FIG. 10B is an end view of the single jet interaction-type fluidic oscillator of FIG. 10A.
Figure 11A:
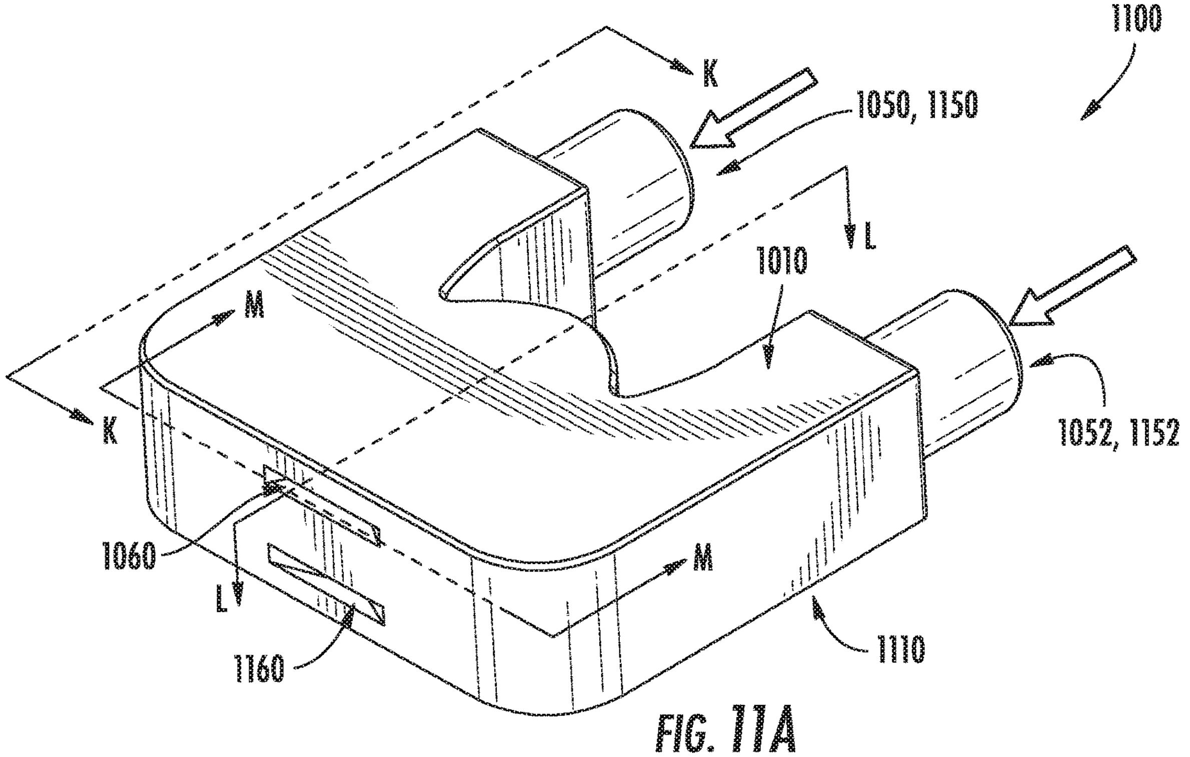
FIG. 11A is a perspective view of a feedback type fluidic oscillator device with atomized output, according to another implementation.
Figure 11B:
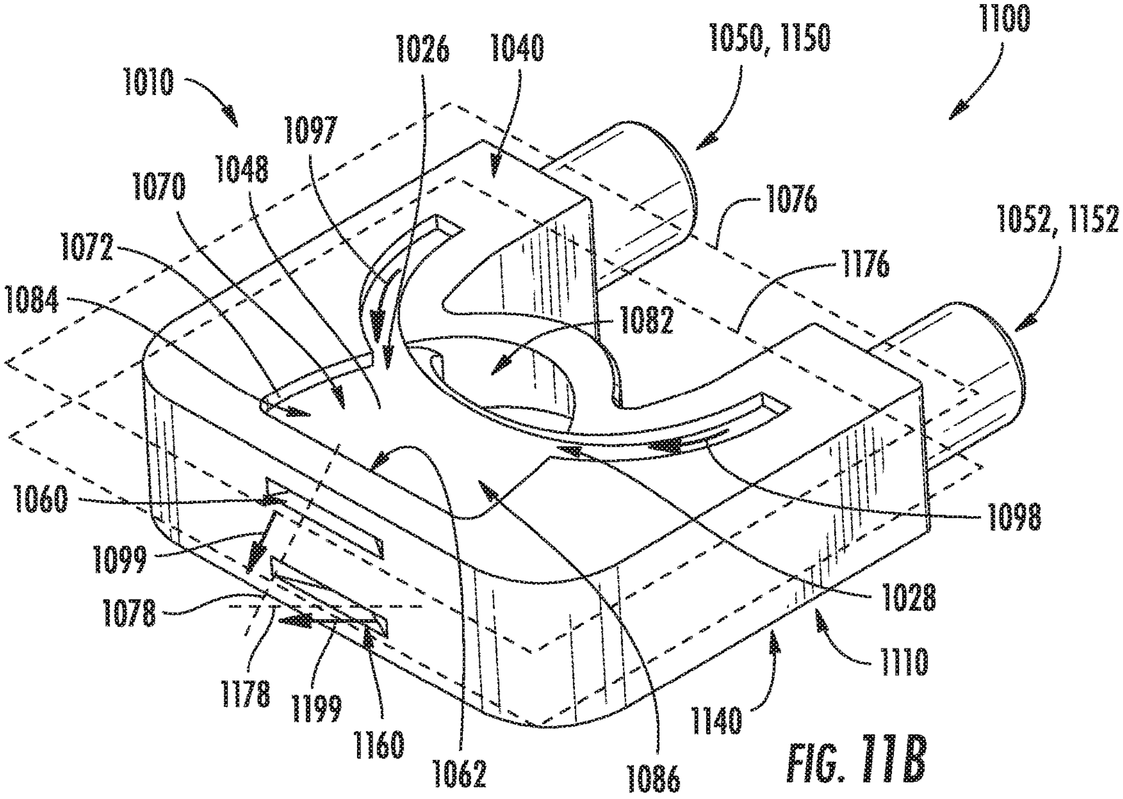
FIG. 11B is a cross-sectional view of the device of FIG. 11A along line K-K.
Figure 11C:
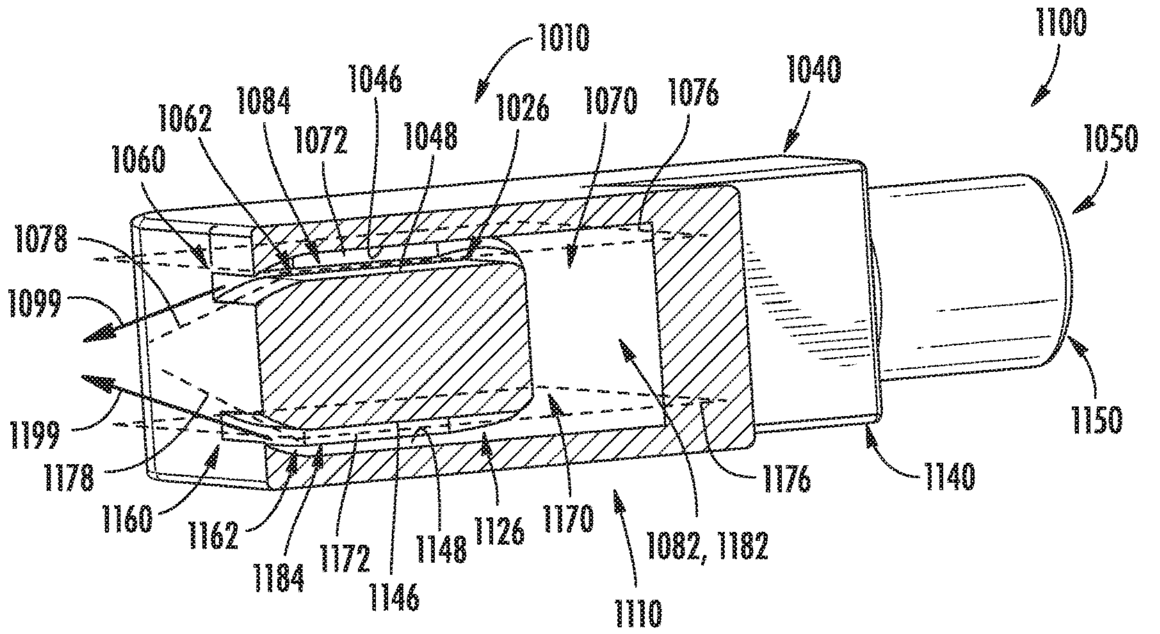
FIG. 11C is a cross-sectional view of the device of FIG. 11A along line L-L.
Figure 11D:
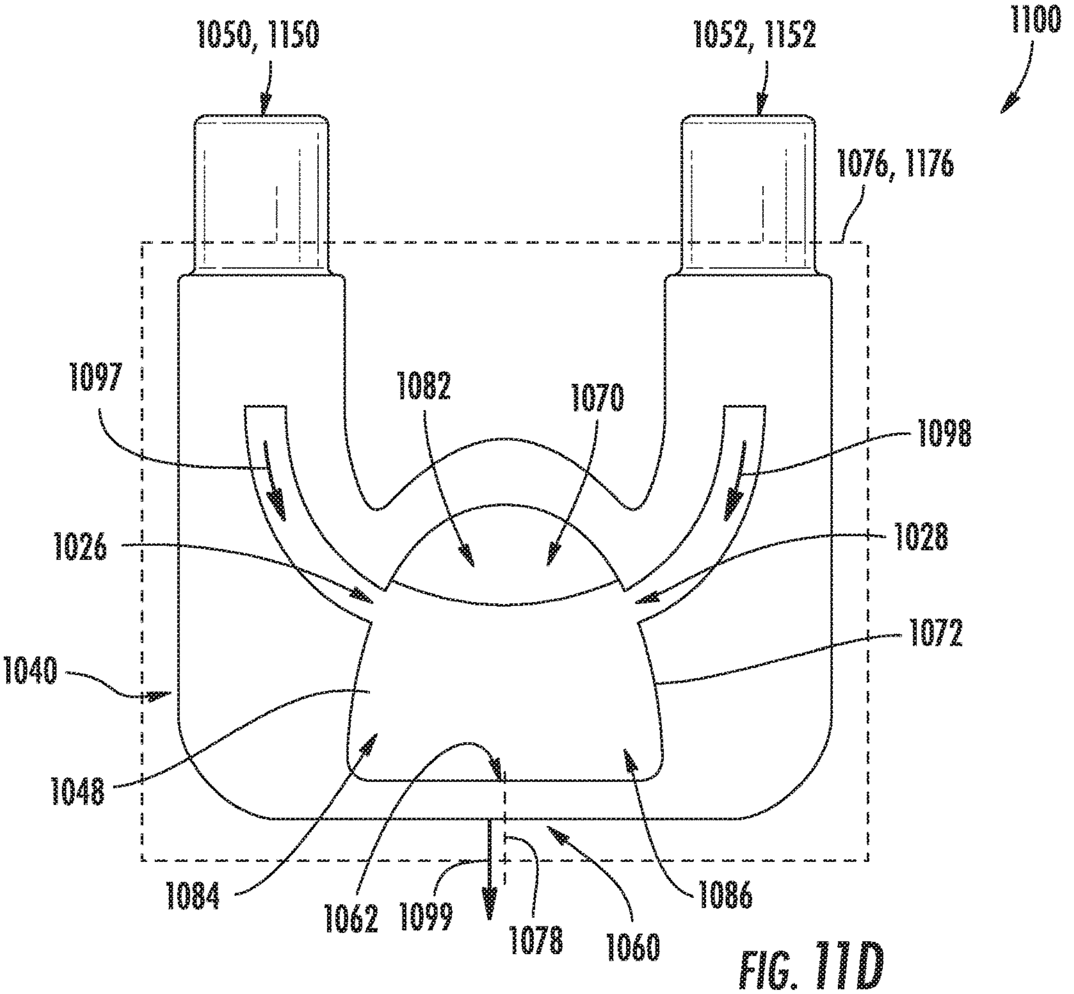
FIG. 11D is a cross-sectional view of the device of FIG. 11A along line M-M.

FIG. 10A shows a top view of a jet interaction-type fluidic oscillator 1010 of the prior art, and FIG. 10B shows an end view of the jet interaction-type fluidic oscillator 1010 of the prior art as viewed from the outlet nozzle 1060 of the body 1040. The jet interaction-type fluidic oscillator 1010 includes a body 1040 having a first surface 1046, a second surface 1048 opposite and spaced apart from the first surface 1046, a chamber wall 1072 extending from the first surface 1046 to the second surface 1048, and an interaction chamber plane 1076 disposed equally distanced from the first surface 1046 and the second surface 1048. The chamber wall 1072 defines an interaction chamber 1070, a first inlet port 1026, a second inlet port 1028, and an outlet port 1062.

The interaction chamber 1070 includes three regions in which vortices are created by the introduction of first and second inlet fluid streams 1097, 1098 from the inlet ports 1026, 1028 into the interaction chamber 1070: a back vortex region 1082, a first side vortex region 1084, and a second side vortex region 1086. The back vortex region 1082 is located adjacent a portion of the chamber wall 1072 between the first inlet port 1026 and the second inlet port 1028. The first side vortex region 1084 is located adjacent a portion of the chamber wall 1072 between the first inlet port 1026 and the outlet port 1062. The second side vortex region 1086 is located adjacent a portion of the chamber wall 1072 between the second inlet port 1028 and the outlet port 1062.

The body 1040 of the fluidic oscillator 1010 further defines a first fluid supply inlet 1050, a second fluid supply inlet 1052, and an outlet nozzle 1060. The first fluid supply inlet 1050 is in fluid communication with the interaction chamber 1070 via the first inlet port 1026; the second fluid supply inlet 1052 is in fluid communication with the interaction chamber 1070 via the second inlet port 1028, and the outlet nozzle 1060 is in fluid communication with the interaction chamber 1070 via the outlet port 1062. The outlet nozzle 1060 also includes a central axis 1078 extending from the interaction chamber 1070 to the exiting end of the outlet nozzle 1060.

A first inlet fluid stream 1097 enters the interaction chamber 1070 of the fluidic oscillator 1010 through the first fluid supply inlet 1050, through the first inlet port 1026, through the interaction chamber 1070, and exits the fluidic oscillator 1010 through the outlet port 1062 and the outlet nozzle 1060. Simultaneously, a second inlet fluid stream 1098 enters the fluidic oscillator 1010 through the second fluid supply inlet 1052, through the second inlet port 1028, through the interaction chamber 1070, and exits the fluidic oscillator 1010 through the outlet port 1062 and the outlet nozzle 1060. The first inlet fluid stream 1097 and second inlet fluid stream 1098 are angled to collide with each other in the interaction chamber 1070. As the first inlet fluid stream 1097 and second inlet fluid stream 1098 collide in the interaction chamber 1070, vortices are created in each of the back vortex region 1082, first side vortex region 1084, and second side vortex region 1086, causing the outlet fluid stream 1099 to oscillate as the outlet fluid stream 1099 exits the interaction chamber 1070 through the outlet port 1062 and the outlet nozzle 1060.

FIGS. 11A-11D show a jet interaction-type fluidic oscillator device 1100 according to one implementation of the current application. The device 1100 includes a first jet interaction-type fluidic oscillator 1010 and a second jet interaction-type fluidic oscillator 1110. Both the first fluidic oscillator 1010 and the second fluidic oscillator 1110 are similar to the fluidic oscillator 1010 shown in FIG. 10, and thus, features of the fluidic oscillators 1010, 1110 of device 1100 are indicated using similar reference numbers. The fluidic oscillators 1010, 1110 are stacked such that the second surface 1048 of the first fluidic oscillator 1010 is adjacent the first surface 1146 of the second fluidic oscillator 1110. The interaction plane 1076 of the first fluidic oscillator 1010 is parallel with the interaction chamber plane 1176 of the second fluidic oscillator 1110. In the device 1100 of FIGS. 11A-11D, the interaction chamber 1070 of the first fluidic oscillator 1010 and the interaction chamber 1170 of the second fluidic oscillator 1110 share a common hack vortex region 1082, 1182 such that the interaction chambers 1070, 1170 are in fluid communication with each other.

The interaction planes 1076, 1176 of the device 1100 shown in FIGS. 11A-11D are parallel to each other, but in other implementations, the interaction chamber planes are at any angle relative to each other. The device 1100 shown in FIGS. 11A-11D includes two fluidic oscillators 1010, 1110 but in other implementations, the device includes three or more fluidic oscillators.

When the inlet fluid streams 1097, 1098 in the first fluidic oscillator 1010 collide with each other in the interaction chamber 1070, vortices are created in the back vortex region 1082, first side vortex region 1084, and second side vortex region 1086 of the interaction chamber 1070. Simultaneously, the inlet fluid streams 1197, 1198 in the second fluidic oscillator 1110 collide with each other in the interaction chamber 1170, creating vortices in the back vortex region 1182, first side vortex region 1184, and second side vortex region 1186 of the interaction chamber 1170. Because the back vortex region 1082 of the first fluidic oscillator 1010 is in fluid communication with the back vortex region 1182 of the second fluidic oscillator 1110, the vortex created in the back vortex region 1082, 1182 of one fluidic oscillator 1010, 1110 affects the vortex created in the back vortex region 1082, 1182 of the other fluidic oscillator 1010, 1110, which causes the outlet fluid streams 1099, 1199 exiting the outlet nozzles 1060, 1160 to oscillate at the same frequency and in phase with each other such that the wave form of the exiting outlet fluid streams 1099, 1199 reach their same respective apices simultaneously.

To create an atomized output, the outlet nozzle 1060 of the first fluidic oscillator 1010 and the outlet nozzle 1160 of the second fluidic oscillator 1110 are structured such that the outlet fluid streams 1099, 1199 exiting the outlet nozzle 1060 of the first fluidic oscillator 1010 and the outlet nozzle 1160 of the second fluidic oscillator 1110 collide with each other. As with the device 200 shown in FIGS. 2A-2D, the outlet nozzles 1060, 1160 of the first fluidic oscillator 1010 and the second fluidic oscillator 1110 of the device 1100 shown in FIGS. 11A-11D are angled toward each other such that the exiting outlet fluid streams 1099, 1199 collide with each other after exiting the outlet nozzles 1060, 1160, The central axis 1078 of the outlet nozzle 1060 of the first fluidic oscillator 1010 is disposed at a first angle 1079 to the interaction chamber plane 1076 of the first fluidic oscillator 1010. Similarly, the central axis 1178 of the outlet nozzle 1160 of the second fluidic oscillator 1110 is disposed at a second angle 1179 to the interaction chamber plane 1176 of the second fluidic oscillator 1110. In FIGS. 11A-11D, the first angle 1079 is 30 degrees and the second angle 1179 is 30 degrees, but in other implementations, the first angle and the second angle are any other angle between 0 and 90 degrees and can be different angles than each other. It should be noted that as the first angle 1079 and the second angle 1179 increase, the angles at which the respective exiting outlet fluid streams 1099, 1199 contact the upper and lower surfaces of the outlet nozzles 1060, 1160 increases, decreasing the performance of the oscillating exiting fluid streams 1099, 1199. In other implementations, the device includes shared back vortex regions to create in-phase oscillations for the output fluid streams, similar to the device 1100 shown in FIGS. 11A-11D, but includes one of the features from the devices shown in FIGS. 3-8 for creating an atomized output by causing the output fluid streams to collide with each other.

Thus, the outlet nozzles 1060, 1160 of the fluidic oscillators 1010, 1110 are structured such that the exiting outlet fluid streams 1099, 1199 collide with each other after exiting the outlet nozzles 1060, 1160. As the exiting outlet fluid streams 1099, 1199 collide with each other, the two outlet fluid streams 1099, 1199 break apart into small droplets and are atomized. Because the two exiting outlet fluid streams 1099, 1199 oscillate in phase with each other, the outlet fluid streams 1099, 1199 are constantly colliding with each other as they oscillate, causing the point of collision to move from side to side. Thus, the atomization of the outlet fluid streams 1099, 1199 is produced at a wider angle and results in a more even coverage than if the colliding fluid streams were not oscillating.

Figure 12A:
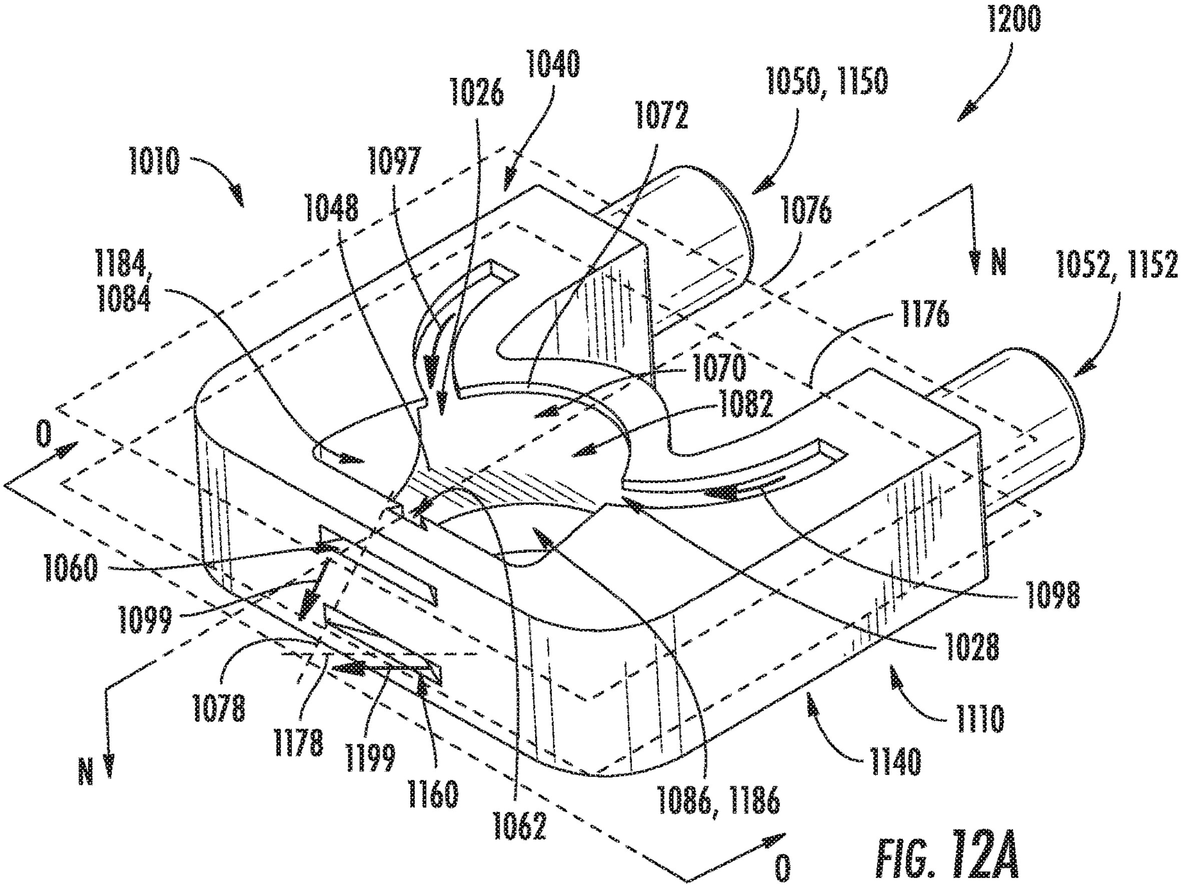
FIG. 12A is a perspective view of a jet interaction-type fluidic oscillator device with atomized output, according to another implementation.
Figure 12B:
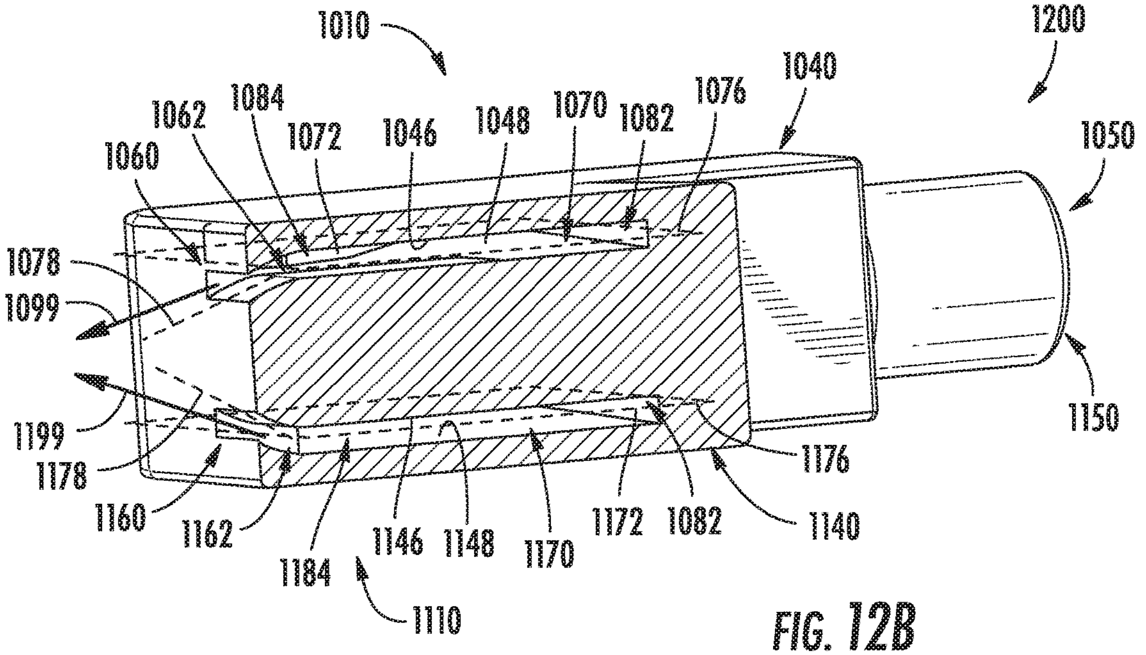
FIG. 12B is a cross-sectional view of the device of FIG. 12A along line N-N.
Figure 12C:
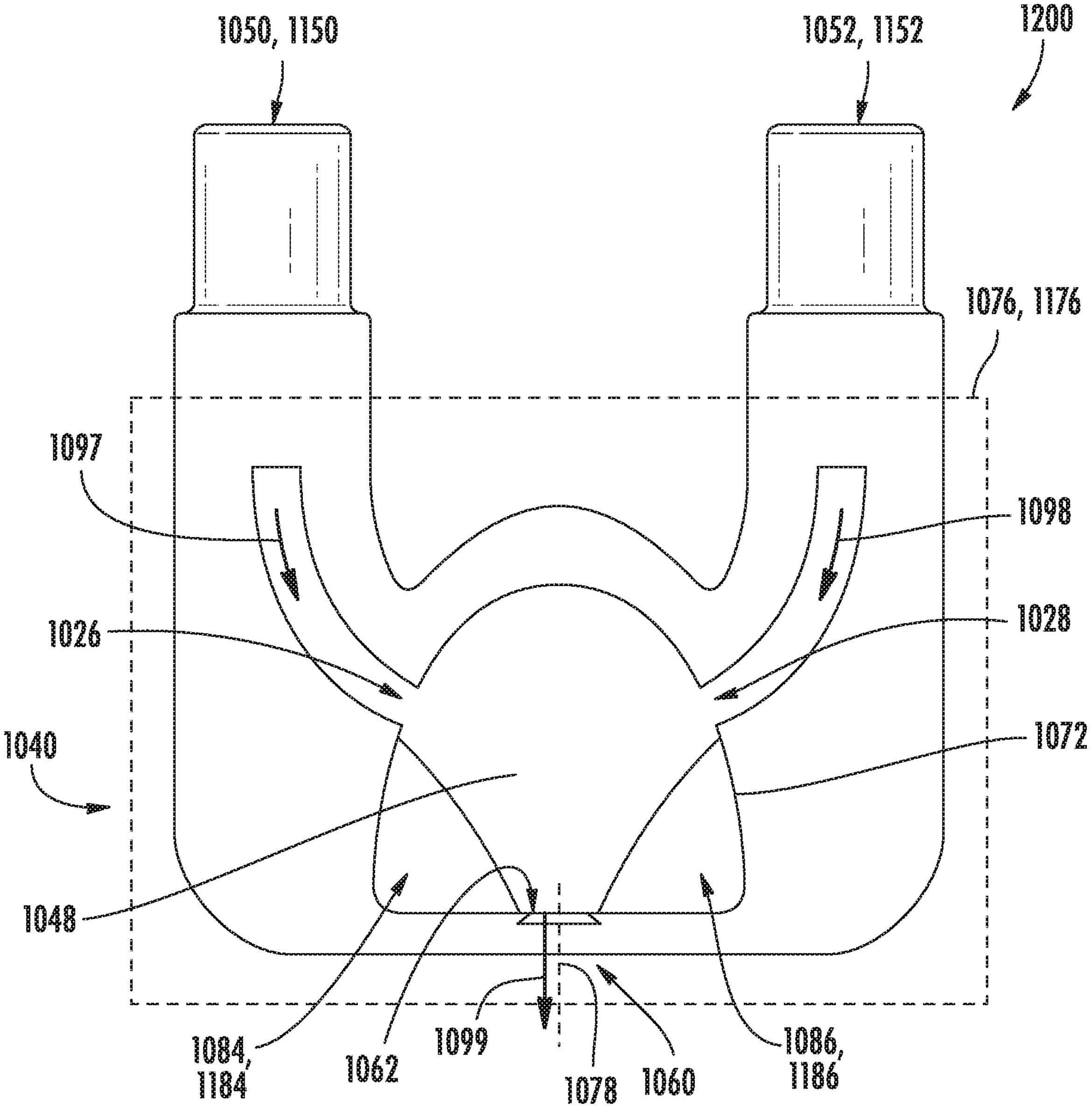
FIG. 12C is a cross-sectional view of the device of FIG. 12A along line O-O.

FIGS. 12A-12C show a jet interaction-type fluidic oscillator device 1200 according to one implementation of the current application. The device 1200 includes a first jet interaction-type fluidic oscillator 1010 and a second jet interaction-type fluidic oscillator 1110. Both the first fluidic oscillator 1010 and the second fluidic oscillator 1110 are similar to the fluidic oscillator 1010 shown in FIG. 10, and thus, features of the fluidic oscillators 1010, 1110 of device 1200 are indicated using similar reference numbers. The fluidic oscillators 1010, 1110 are stacked such that the second surface 1048 of the first fluidic oscillator 1010 is adjacent the first surface 1146 of the second fluidic oscillator 1110. The interaction plane 1076 of the first fluidic oscillator 1010 is parallel with the interaction chamber plane 1176 of the second fluidic oscillator 1110. In the device 1200 of FIGS. 12A-12C, the interaction chamber 1070 of the first fluidic oscillator 1010 and the interaction chamber 1170 of the second fluidic oscillator 1110 share common first side vortex regions 1084, 1184 and second side vortex regions 1086, 1186 such that the interaction chambers 1070, 1170 are in fluid communication with each other.

The interaction planes 1076, 1176 of the device 1200 shown in FIGS. 12A-12C are parallel to each other, but in other implementations, the interaction chamber planes are at any angle relative to each other. The device 1200 shown in FIGS. 12A-12C includes two fluidic oscillators 1010, 1110, but in other implementations, the device includes three or more fluidic oscillators.

When the inlet fluid streams 1097, 1098 in the first fluidic oscillator 1010 collide with each other in the interaction chamber 1070, vortices are created in the back vortex region 1082, first side vortex region 1084, and second side vortex region 1086 of the interaction chamber 1070. Simultaneously, the inlet fluid streams 1197, 1198 in the second fluidic oscillator 1110 collide with each other in the interaction chamber 1170, creating vortices in the back vortex region 1182, first side vortex region 1184, and second side vortex region 1186 of the interaction chamber 1170. Because the first side vortex region 1084 and second side vortex region 1086 of the first fluidic oscillator 1010 are in fluid communication with the first side vortex region 1184 and second side vortex region 1186 of the second fluidic oscillator 1110, the vortices created in the first side vortex region 1084, 1184 and second side vortex region 1086, 1186 of one fluidic oscillator 1010, 1110 affect the vortices created in the first side vortex region 1084, 1184 and second side vortex region 1086, 1186 of the other fluidic oscillator 1010, 1110, which causes the outlet fluid streams 1099, 1199 exiting the outlet nozzles 1060, 1160 to oscillate at the same frequency and in phase with each other such that the wave form of the exiting outlet fluid streams 1099, 1199 reach their same respective apices simultaneously.

To create an atomized output, the outlet nozzle 1060 of the first fluidic oscillator 1010 and the outlet nozzle 1160 of the second fluidic oscillator 1110 are structured such that the outlet fluid streams 1099, 1199 exiting the outlet nozzle 1060 of the first fluidic oscillator 1010 and the outlet nozzle 1160 of the second fluidic oscillator 1110 collide with each other. As with the device 200 shown in FIGS. 2A-2D, the outlet nozzles 1060, 1160 of the first fluidic oscillator 1010 and the second fluidic oscillator 1110 of the device 1200 shown in FIGS. 12A-12C are angled toward each other such that the exiting outlet fluid streams 1099, 1199 collide with each other after exiting the outlet nozzles 1060, 1160, The central axis 1078 of the outlet nozzle 1060 of the first fluidic oscillator 1010 is disposed at a first angle 1079 to the interaction chamber plane 1076 of the first fluidic oscillator 1010. Similarly, the central axis 1178 of the outlet nozzle 1160 of the second fluidic oscillator 1110 is disposed at a second angle 1179 to the interaction chamber plane 1176 of the second fluidic oscillator 1110. In FIGS. 12A-12C, the first angle 1079 is 30 degrees and the second angle 1179 is 30 degrees, but in other implementations, the first angle and the second angle are any other angle between 0 and 90 degrees and can be different angles than each other. It should be noted that as the first angle 1079 and the second angle 1179 increase, the angles at which the respective exiting outlet fluid streams 1099, 1199 contact the upper and lower surfaces of the outlet nozzles 1060, 1160 increases, decreasing the performance of the oscillating exiting fluid streams 1099, 1199. In other implementations, the device includes shared first side vortex regions and second side vortex regions, similar to the device 1200 shown in FIGS. 12A-12C, to create in-phase oscillations for the output fluid streams but includes one of the features from the devices shown in FIGS. 3-8 for creating an atomized output by causing the output fluid streams to collide with each other.

Thus, the outlet nozzles 1060, 1160 of the fluidic oscillators 1010, 1110 are structured such that the exiting outlet fluid streams 1099, 1199 collide with each other after exiting the outlet nozzles 1060, 1160. As the exiting outlet fluid streams 1099, 1199 collide with each other, the two outlet fluid streams 1099, 1199 break apart into small droplets and are atomized. Because the two exiting outlet fluid streams 1099, 1199 oscillate in phase with each other, the outlet fluid streams 1099, 1199 are constantly colliding with each other as they, oscillate, causing the point of collision to move from side to side. Thus, the atomization of the outlet fluid streams 1099, 1199 is produced at a wider angle and results in a more even coverage than if the colliding fluid streams were not oscillating.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

What is claimed is:

1. A fluidic oscillator device with atomized output, the device comprising:

at least two fluidic oscillators, the at least two fluidic oscillators including a first fluidic oscillator and a second fluidic oscillator, each of the first fluidic oscillator and second fluidic oscillator comprising:

an interaction chamber having a first surface, a second surface opposite and spaced apart from the first surface, an interaction chamber plane being disposed equally distanced from the first surface and the second surface, and a first attachment wall and a second attachment wall extending between the first surface and the second surface, the first attachment wall and the second attachment wall being opposite and spaced apart from each other, a fluid supply inlet for introducing a fluid stream into the interaction chamber, an outlet nozzle downstream of the fluid supply inlet, wherein the fluid stream exits the interaction chamber through the outlet nozzle, and a first feedback channel coupled to the first attachment wall and a second feedback channel coupled to the second attachment wall, the first feedback channel and second feedback channel being in fluid communication with the interaction chamber, each of the first feedback channel and second feedback channel having a first end, a second end opposite and spaced apart from the first end, and an intermediate portion disposed between the first end and second end, wherein the first end is adjacent the outlet nozzle and the second end is adjacent the fluid supply inlet, wherein the first attachment wall and second attachment wall of the interaction chamber are shaped to allow fluid from the fluid stream to flow into the first ends of the first feedback channel and second feedback channel, respectively, causing the fluid stream to oscillate between the first attachment wall and second attachment wall of the interaction chamber;

wherein the first feedback channel of the first fluidic oscillator and the first feedback channel of the second fluidic oscillator share a common portion such that the first feedback channels are in fluid communication with each other causing the fluid streams exiting the outlet nozzles of the first fluidic oscillator and second fluidic oscillator to oscillate in phase with each other, and wherein the outlet nozzle of the first fluidic oscillator and the outlet nozzle of the second fluidic oscillator are structured such that the fluid streams exiting the outlet nozzle of the first fluidic oscillator and the outlet nozzle of the second fluidic oscillator continuously collide with each other.

2. The device of claim 1, wherein the first feedback channel of the first fluidic oscillator and the first feedback channel of the second fluidic oscillator share a common intermediate portion.

3. The device of claim 2, wherein the second feedback channel of the first fluidic oscillator and the second feedback channel of the second fluidic oscillator share a common intermediate portion such that the second feedback channels are in fluid communication with each other.

4. The device of claim 1, wherein the first feedback channel of the first fluidic oscillator and the first feedback channel of the second fluidic oscillator share a common first end portion and a common second end portion.

5. The device of claim 4, wherein the second feedback channel of the first fluidic oscillator and the second feedback channel of the second fluidic oscillator share a common first end portion and a common second end portion such that the second feedback channels are in fluid communication with each other.

6. The device of claim 1, wherein an outlet nozzle plane of the outlet nozzle of the first fluidic oscillator has a central axis, and the central axis of the outlet nozzle plane of the first fluidic oscillator is disposed at a first angle to the interaction chamber plane of the first fluidic oscillator, the first angle being between 0 and 90 degrees.

7. The device of claim 6, wherein an outlet nozzle plane of the outlet nozzle of the second fluidic oscillator has a central axis, and the central axis of the outlet nozzle plane of the second fluidic oscillator is disposed at a second angle to the interaction chamber plane of the second fluidic oscillator, the second angle being between 0 and 90 degrees.

8. The device of claim 1, wherein the interaction chamber plane of the first fluidic oscillator is at an angle to the interaction chamber plane of the second fluidic oscillator, the angle being between 0 and 180 degrees, wherein a distance between the outlet nozzles is shorter than a distance between the fluid supply inlets.

9. The device of claim 1, wherein the outlet nozzle of the first fluidic oscillator has a central axis and an axis of rotation, and at least a portion of the central axis of the outlet nozzle plane of the first fluidic oscillator extends circumferentially around the axis of rotation of the outlet nozzle plane of the first fluidic oscillator.

10. The device of claim 9, wherein the outlet nozzle of the second fluidic oscillator has a central axis and an axis of rotation, and at least a portion of the central axis of the outlet nozzle plane of the second fluidic oscillator extends circumferentially around the axis of rotation of the outlet nozzle plane of the second fluidic oscillator.

11. The device of claim 1, wherein the first fluidic oscillator has an axis of rotation, and at least a portion of the interaction chamber plane of the first fluidic oscillator extends circumferentially around the axis of rotation of the first fluidic oscillator.

12. The device of claim 11, wherein the second fluidic oscillator has an axis of rotation, and at least a portion of the interaction chamber plane of the second fluidic oscillator extends circumferentially around the axis of rotation of the second fluidic oscillator.

13. The device of claim 1, wherein the outlet nozzle of the first fluidic oscillator comprises at least one first control port for introducing fluid into, or suctioning fluid from, the outlet nozzle of the first fluidic oscillator to redirect the fluid stream exiting the outlet nozzle of the first fluidic oscillator.

14. The device of claim 13, wherein the outlet nozzle of the second fluidic oscillator comprises at least one second control port for introducing fluid into, or suctioning fluid from, the outlet nozzle of the second fluidic oscillator to redirect the fluid stream exiting the outlet nozzle of the second fluidic oscillator.

15. The device of claim 1, wherein the first fluidic oscillator comprises a hinging portion for changing an angle of the fluid stream exiting the outlet nozzle of the first fluidic oscillator relative to the fluid stream exiting the outlet nozzle of the second fluidic oscillator.

16. The device of claim 15, wherein the second fluidic oscillator comprises a hinging portion for changing an angle of the fluid stream exiting the outlet nozzle of the second fluidic oscillator relative to the fluid stream exiting the outlet nozzle of the first fluidic oscillator.

17. The device of claim 1, wherein the interaction chamber plane of the first fluidic oscillator is spaced apart from the interaction chamber plane of the second fluidic oscillator in a direction normal to the interaction chamber plane of the first fluidic oscillator.

18. The device of claim 1, wherein the interaction chamber plane of the first fluidic oscillator is parallel to and spaced apart from the interaction chamber plane of the second fluidic oscillator.

* * * * *